US007035261B2

(12) United States Patent    (10) Patent No.: US 7,035,261 B2
Ogawa et al.    (45) Date of Patent: Apr. 25, 2006

(54) ROUTING CONTROL METHOD AND APPARATUS THEREOF IN A MIXED ENVIRONMENT OF A HIERARCHIAL NETWORK AND A NON-HIERARCHIAL NETWORK

(75) Inventors: Jun Ogawa, Kawasaki (JP); Yuji Saito, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 10/075,430

(22) Filed: Feb. 13, 2002

(65) Prior Publication Data

US 2002/0075872 A1    Jun. 20, 2002

Related U.S. Application Data

(63) Continuation of application No. PCT/JP99/05373, filed on Sep. 30, 1999.

(51) Int. Cl.
*H04L 12/28* (2006.01)
*H04L 12/56* (2006.01)

(52) U.S. Cl. ........................... 370/392; 370/466

(58) Field of Classification Search ............... 370/392, 370/401, 409, 474, 475, 400, 465, 466, 469, 370/402, 462
See application file for complete search history.

(56) References Cited

U.S. PATENT DOCUMENTS

| | | | | |
|---|---|---|---|---|
| 5,251,205 A | * | 10/1993 | Callon et al. ............... 370/392 |
| 5,557,745 A | * | 9/1996 | Perlman et al. ............. 709/242 |
| 5,856,974 A | * | 1/1999 | Gervais et al. ............. 370/392 |
| 5,999,541 A | * | 12/1999 | Hinchey et al. ............ 370/466 |
| 6,038,233 A | * | 3/2000 | Hamamoto et al. ......... 370/401 |
| 6,046,999 A | * | 4/2000 | Miki et al. ............. 370/395.52 |
| 6,094,525 A | * | 7/2000 | Perlman et al. ........ 370/395.52 |
| 6,101,189 A | * | 8/2000 | Tsuruoka .................... 370/392 |
| 6,118,784 A | * | 9/2000 | Tsuchiya et al. ............ 709/238 |
| 6,157,950 A | * | 12/2000 | Krishnan .................... 709/223 |
| 2001/0040895 A1 | * | 11/2001 | Templin ..................... 370/466 |

FOREIGN PATENT DOCUMENTS

JP    10136052    5/1998

OTHER PUBLICATIONS

Callon, R. "Routing Aspects of IPv6 Transition." Networking Working Group RFC 2185. Sep. 1997.*

(Continued)

*Primary Examiner*—Huy D. Vu
*Assistant Examiner*—Daniel Ryman
(74) *Attorney, Agent, or Firm*—Katten Muchin Rosenman LLP

(57) ABSTRACT

A high-speed routing search is realized by a hierarchical routing table, while a conventional network having a hierarchical network as a backbone performs conventional operations without being aware of the hierarchical backbone network, in a mixed environment of the hierarchical and non-hierarchical networks, by assigning the non-hierarchical network a virtual hierarchy number equivalent to a hierarchy number in the hierarchical network, attaching the virtual hierarchical number to a packet to be relayed at a router located at an entrance from the non-hierarchical network to the hierarchical network, performing hierarchical routing control by the virtual hierarchy number within the hierarchical network, and by removing the virtual hierarchy number from the packet to be relayed at a router located at an exit from the hierarchical network to the non-hierarchical network.

10 Claims, 29 Drawing Sheets

OTHER PUBLICATIONS

Gilligan, R. "Transition Mechanisms for IPv6 Hosts and Routers." Networking Working Group RFC 1933. Apr. 1996.*

Rekhter, Y. "An Architecture fopr IPv6 Unicast Address Allocation." Networking Working Group RFC 1887. Dec, 1995.*

Malkin, G. "RIPing for IPv6." Networking Working Group RFC 2080. Jan. 1997.*

Hinden, R. "IP Version 6 Addressing Architecture." Networking Working Group RFC 2373. Jul. 1998.*

* cited by examiner

FIG.5

```
| 3 | 13  | 8  | 24  | 16  | 64 bits      |
+---+-----+----+-----+-----+--------------+
|FP| TLA |RES| NLA | SLA | Interface ID  |
|  | ID  |   | ID  | ID  |               |
+---+-----+----+-----+-----+--------------+
```

001           Format Prefix (3 bit) for Aggregatable Global
              Unicast Adderss
TLA ID        Top-Level Aggregation Identifier
RES           Reserved for future use
NLA ID        Next-Level Aggregation Identifier
SLA ID        Site-Level Aggregation Identifier
INTERFACE ID  Interface Identifier

FIG.6

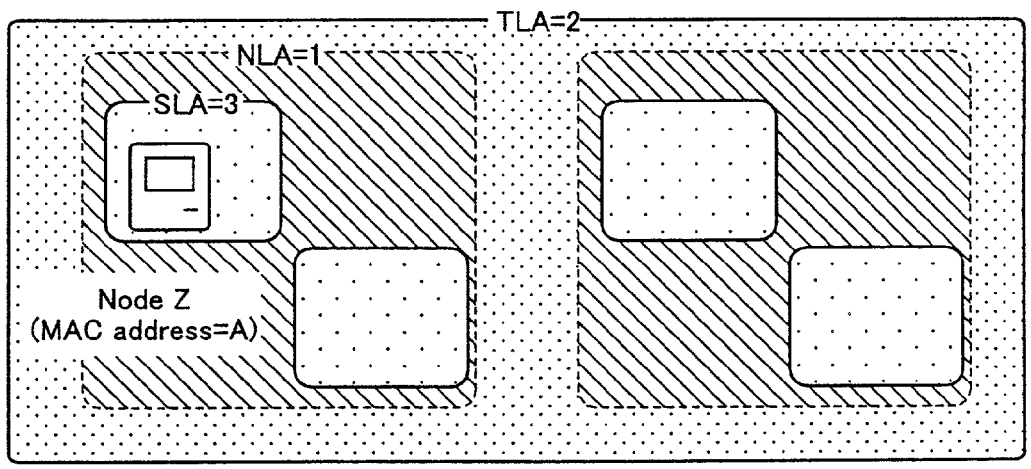

HIERARCHY OF TLA LEVEL

HIERARCHY OF NLA LEVEL

HIERARCHY OF SLA LEVEL

```
| 3 | 13  | 8  | 24  | 16  | 64 bits      |
+---+-----+----+-----+-----+--------------+
|FP| TLA |RES| NLA | SLA | Interface ID  |
|  | ID  |   | ID  | ID  | =A            |
|  | =2  |   | =1  | =3  |               |
+---+-----+----+-----+-----+--------------+
```

IP ADDRESS OF NODE 2

FIG.10

| 3 | 13 | 8 | 24 | 16 | 64 bits |
|---|----|---|----|----|---------|
| FP | TLA ID | RES | NLA ID | SLA ID | Interface ID<br>All 0 |

IPv6 NETWORK ADDRESS

| 3 | 13 | 8 | 24 | 16 | 64 bits |
|---|----|---|----|----|---------|
| FP | TLA ID | RES | NLA ID | SLA ID | Interface ID<br>32bit=0, AA.BB.CC.0 |

IPv4 NETWORK ADDRESS

| 3 | 13 | 8 | 24 | 16 | 64 bits |
|---|----|---|----|----|---------|
| FP | TLA ID | RES | NLA ID | SLA ID | Interface ID<br>Layer2 address |

IPv6 HOST ADDRESS

FIG.27

ROUTING TABLE OF ROUTER B

HIERARCHIAL ROUTING TABLE

| ADDRESS | NEXT ROUTER |
|---|---|
| SLA ID=3 | IPv4 |
| SLA ID=1 | DIRECT(B2) |

CONVENTIONAL ROUTING TABLE

| ADDRESS | NEXT ROUTER |
|---|---|
| SLA ID=3 AA.BB.CC.00/24 | DIRECT(B1) |
| SLA ID=3 AA.BB.DD.00/24 | DIRECT A(B1) |
| SLA ID=1 | DIRECT (B2) |

TRANSMISSION INTERFACE NAME IN PARENTHESIS

FIG.28

ROUTING TABLE OF ROUTER C

▨ TABLE GENERATED BASED ON ROUTING INFORMATION FROM ROUTER B

HIERARCHIAL ROUTING TABLE

| ADDRESS | NEXT ROUTER |
|---|---|
| SLA ID=3 | ROUTER B(C1) |
| SLA ID=1 | DIRECT(C1) |
| SLA ID=2 | DIRECT(C2) |

CONVENTIONAL ROUTING TABLE

| ADDRESS | NEXT ROUTER |
|---|---|
| SLA ID=3 AA.BB.CC.00/24 | ROUTER B(C1) |
| SLA ID=3 AA.BB.DD.00/24 | ROUTER B(C1) |
| SLA ID=2 | DIRECT A(C2) |
| SLA ID=1 | DIRECT (C1) |

TRANSMISSION INTERFACE NAME IN PARENTHESIS

FIG.29

ROUTING TABLE OF ROUTER D

▒▒▒ TABLE GENERATED BASED ON ROUTING INFORMATION FROM ROUTER C

| HIERARCHIAL ROUTING TABLE | |
|---|---|
| ADDRESS | NEXT ROUTER |
| SLA ID=3 | ROUTER C(D2) |
| SLA ID=1 | DIRECT C(D2) |
| SLA ID=2 | DIRECT(D2) |
| SLA ID=4 | IPv4(D1) |

TRANSMISSION INTERFACE NAME IN PARENTHESIS

| CONVENTIONAL ROUTING TABLE | |
|---|---|
| ADDRESS | NEXT ROUTER |
| SLA ID=3 AA.BB.CC.00/24 | ROUTER C(D2) |
| SLA ID=3 AA.BB.DD.00/24 | ROUTER C(D2) |
| SLA ID=1 | ROUTER C(D2) |
| SLA ID=2 | DIRECT(D2) |
| SLA ID=4 AA.BB.EE.00/24 | DIRECT(D1) |

FIG.31

ROUTING TABLE OF ROUTER D  ▢ MATCHED ENTRY IN ROUTING SEARCH

HIERARCHIAL ROUTING TABLE

| ADDRESS | NEXT ROUTER |
|---|---|
| SLA ID=3 | ROUTER C(D2) |
| SLA ID=1 | ROUTER C(D2) |
| SLA ID=2 | DIRECT(D2) |
| SLA ID=4 | IPv4(D1) |

TRANSMISSION INTERFACE NAME IN PARENTHESIS

CONVENTIONAL ROUTING TABLE

| ADDRESS | NEXT ROUTER |
|---|---|
| SLA ID=3 AA.BB.CC.00/24 | ROUTER C(D2) |
| SLA ID=3 AA.BB.DD.00/24 | ROUTER C(D2) |
| SLA ID=1 | ROUTER C(D2) |
| SLA ID=2 | DIRECT(D2) |
| SLA ID=4 AA.BB.EE.00/24 | DIRECT(D1) |

FIG.32

ROUTING TABLE OF ROUTER C

HIERARCHIAL ROUTING TABLE

| ADDRESS | NEXT ROUTER |
|---|---|
| SLA ID=3 | ROUTER B(C1) |
| SLA ID=1 | DIRECT(C1) |
| SLA ID=2 | DIRECT(C2) |

TRANSMISSION INTERFACE NAME IN PARENTHESIS

CONVENTIONAL ROUTING TABLE

| ADDRESS | NEXT ROUTER |
|---|---|
| SLA ID=3 AA.BB.CC.00/24 | ROUTER B(C1) |
| SLA ID=3 AA.BB.DD.00/24 | ROUTER B(C1) |
| SLA ID=2 | DIRECT(C2) |
| SLA ID=1 | DIRECT(C1) |

FIG.33

ROUTING TABLE OF ROUTER B

| HIERARCHIAL ROUTING TABLE | | CONVENTIONAL ROUTING TABLE | |
|---|---|---|---|
| ADDRESS | NEXT ROUTER | ADDRESS | NEXT ROUTER |
| SLA ID=3 | IPv4 | SLA ID=3 AA.BB.CC.00/24 | DIRECT(B1) |
| SLA ID=1 | DIRECT(B2) | SLA ID=3 AA.BB.DD.00/24 | ROUTER A(B1) |
| | | SLA ID=1 | DIRECT(B2) |

TRANSMISSION INTERFACE NAME IN PARENTHESIS

ROUTING CONTROL METHOD AND APPARATUS THEREOF IN A MIXED ENVIRONMENT OF A HIERARCHIAL NETWORK AND A NON-HIERARCHIAL NETWORK

This application is a continuation of international application number PCT JP99/05373, filed Sep. 30, 1999.

BACKGROUND OF THE INVENTION

1. Field of the Invention

The present invention relates to a routing control method and an apparatus thereof in a mixed environment of a hierarchical network and a non-hierarchical network, and especially relates to the routing control method and the apparatus thereof in the mixed environment of a hierarchy compliant IP (Internet Protocol) and a hierarchy-non-compliant IP.

2. Description of the Related Art

With the rapid proliferation of the Internet and Intranets into offices and campuses, the networks have evolved from conventional experiments to networks that play a central role in business. Further, the transmission speed of physical media, such as Ethernet, has risen from 10 Mbps, to 100 Mbps, and on to 1 Gbps. In order to service the high transmission speed, fast routing search inside a router is required. This requirement has led to the development of a hierarchical network that requires less time for routing search by simplifying network composition, and IPv6 (Internet Protocol version 6) as a hierarchy compliant IP technology to realize the hierarchical network.

However, the main thrust of networks at present is using IPv4 (Internet Protocol version 4) that is not compliant with hierarchy, resulting in a mixture of the non-hierarchical network and the hierarchical network in this transition period to the hierarchical network.

The IPv4, an IP widely used by the Internet at present, provides a 32-bit address, every 8 bits of which is delimited by a dot. The address, having a network block that identifies a network to which the node belongs, and a host block that identifies each node within the network, is assigned to each node. An IP address is suffixed by a slash and a number indicating how many bits the network block has.

For example, for an address 133.160.115.5/24, the first 24 bits (133,160,115) of the 133.160.115.5 represent the network block and 5 represents the host block. Moreover, if 0 is placed in the host block, the IP address indicates a network itself. That is, a network of 133.160.115 is indicated by 133.160.115.0/24.

The routers are installed on boundaries of networks to perform routing selection for a packet, and routing information required therefor is periodically exchanged among the routers. Exchange of the routing information is shown in FIG. 2. Routing information of the address 133.160.115.0/24 is exchanged from a router A to a router B, thereby, the router B recognizes that the address 133.160.115.0/24 exists beyond an address 150.123.212.0/24 (routing information to the router A).

Similarly, the router A recognizes that an address 133.160.116.0/24 exists beyond the address 150.123.212.0/24, using routing information from the router B. The same applies to exchanges between a router C and the routers A and B. Each router is provided with the routing information in a table format, and updates it at the next routing exchange.

FIG. 3 shows an example of a packet relay in a network that has exchanged the routing information as shown in FIG. 2.

1. An IP packet P1 transmitted to a host b from a host a is transmitted to the router A, which is a router of the address 133.160.115.0/24.

2. The router A searches for the network block of the address (133.160.116.0/24) through the entirety of its routing information table.

3. The router A determines that the router B is where the packet should be sent as a result of the search, and transmits the packet P1 to the router B.

4. The router B, upon receiving the packet P1, determines from the network block of the packet P1 that the packet is for its subordinate network, subsequently looks at the host block of the packet P1, and transmits the packet P1 to the host b.

Here, a point to be observed is that a routing search in each of the above clauses 2. and 4. was performed for the whole of the network block. This is because a decision as to which, router B or router C, the router A shall transmit to cannot be made by searching only part of the network block. In other words, the network is not structured in hierarchies based on IP addresses.

In a network that has evolved to be structured in hierarchies, it is not necessary to perform a routing search of an IP address including all the network blocks. Rather, it is performed in reference to a hierarchy. For example, FIG. 4 shows a hierarchical network based on a structure of IP addresses. When a host A on an address α.A.a.0/24 transmits a packet to a host B on an address β.B.a.0/24 in this network, routing selection can be performed by looking at only β in the address of the host B in a subordinate network of an address a α0.0.0/8. Further, a routing selection for the host B can start after the traffic enters under an address β0.0.0.0/8. Namely, it is not always necessary to perform the routing selection in reference to the entire network block.

As a means to realize the hierarchical network as above, a new IP protocol IPv6 is being studied and developed by a standardization organization, IETF (Internet Engineering Task Force) which decides on communication standards about IP. An example of an address format of IPv6 is shown in FIG. 5. As for IPv6, the address is 128 bit long, wherein TLAID (Top Level Aggregation Identifier) indicates the highest level in the hierarchy, and NLAID (Next Level Aggregation Identifier) and SLAID (Site Level Aggregation Identifier) are assigned to subordinate networks in this sequence by a network manager when a network is structured. An interface ID is assigned to each interface of each terminal, and generally a lower layer address, such as a MAC address, is included.

FIG. 6 shows an example of use of an IPv6 address format. As the drawing shows, TLA, NLA and SLA are layered in this order, and a MAC address (A) of a node Z is used as its interface ID. Further, FIG. 7 shows an example of the structure of a hierarchical network which uses IPv6. As shown in the drawing, TLA, NLA, and SLA structure the network with hierarchy, enabling the hierarchical routing search mentioned above.

Because of a high-speed routing search ability, the IPv6 will be introduced in the Internet from backbone to edge. However, in an introductory process, a mixed environment with IPv4 will be inevitable. For this reason, IETF has separately prescribed an address format that realizes mapping of IPv4 addresses onto IPv6 addresses as shown in FIG. 8. Hereinafter, this address format is called an IPv4 compatible IPv6 address format.

Although the IPv4 compatible IPv6 address format is a packet format to realize transmission and relay of a packet between IPv6 and IPv4 networks, the hierarchical structure as shown in FIG. 5 is not employed, but only a structure incorporating an IPv4 address in the address field of IPv6. For this reason, in a mixed environment with an IPv4 network, non-hierarchy-routing control is also required in the IPv6 network.

Expectation of the realization of fast routing control by a hierarchical network structure is growing, driven by the rapid expansion of the Internet/Intranets. As seen above, while a study and development of IPv6 have been undertaken, a problem has been that the high-speed routing control feature of IPv6 by the hierarchic structure could not be adapted in a mixed environment of the IPv4 network and the IPv6 network.

SUMMARY OF THE INVENTION

The present invention generally aims at providing a routing control method and an apparatus therefor in a mixed environment of a hierarchical network and a non-hierarchical network, wherein a high-speed routing search is attained within the hierarchical network when performing routing control to a non-hierarchical network in the mixed environment of the hierarchical network and the non-hierarchical network.

In order to attain this object, the present invention provides the routing control method in the mixed environment of a hierarchical network and a non-hierarchical network by structuring such that a virtual hierarchy number equivalent to a hierarchy number of the hierarchical network is assigned to the non-hierarchical network, when a packet is to be relayed between non-hierarchical networks through a hierarchical network, a router located at an entrance from a first non-hierarchical network to the hierarchical network assigns a virtual hierarchy number to the packet to be relayed, within the hierarchical network, hierarchical routing control is performed on the virtual hierarchy number, and a router located at an exit from the hierarchical network to a second non-hierarchical network removes the virtual hierarchy number from the packet to be relayed.

According to the routing control method in the mixed environment of the hierarchical network and the non-hierarchical network such as above, the non-hierarchical network, having the hierarchical network as a backbone, can operate as usual without being aware of the hierarchical network in the backbone, yet a high-speed routing search via a hierarchical routing table can be realized within the hierarchical network for routing to a non-hierarchical network.

BRIEF DESCRIPTION OF THE DRAWINGS

Other objects, features, and advantages of the present invention will become still clearer by reading the following detailed explanation, referring to an attached drawing.

FIG. 5 is a drawing showing an example of an address format of IPv6.

FIG. 6 is a drawing showing an example of use of an IPv6 address format.

FIG. 10 is a drawing showing the structures of an IPv6 network address, a hierarchy compliant IPv4 compatible IPv6 network address, and an IPv6 host address.

FIG. 27 shows a hierarchical routing table and a conventional routing table of a router B.

FIG. 28 shows a hierarchical routing table and a conventional routing table of a router C.

FIG. 29 shows a hierarchical routing table and a conventional routing table of a router D.

FIG. 31 shows a hierarchical routing table and a conventional routing table of the router D.

FIG. 32 shows a hierarchical routing table and a conventional routing table of the router C.

FIG. 33 shows a hierarchical routing table and a conventional routing table of the router B.

DESCRIPTION OF THE PREFERRED EMBODIMENTS

Hereafter, embodiments of the present invention will be described with reference to figures.

Figure 1:
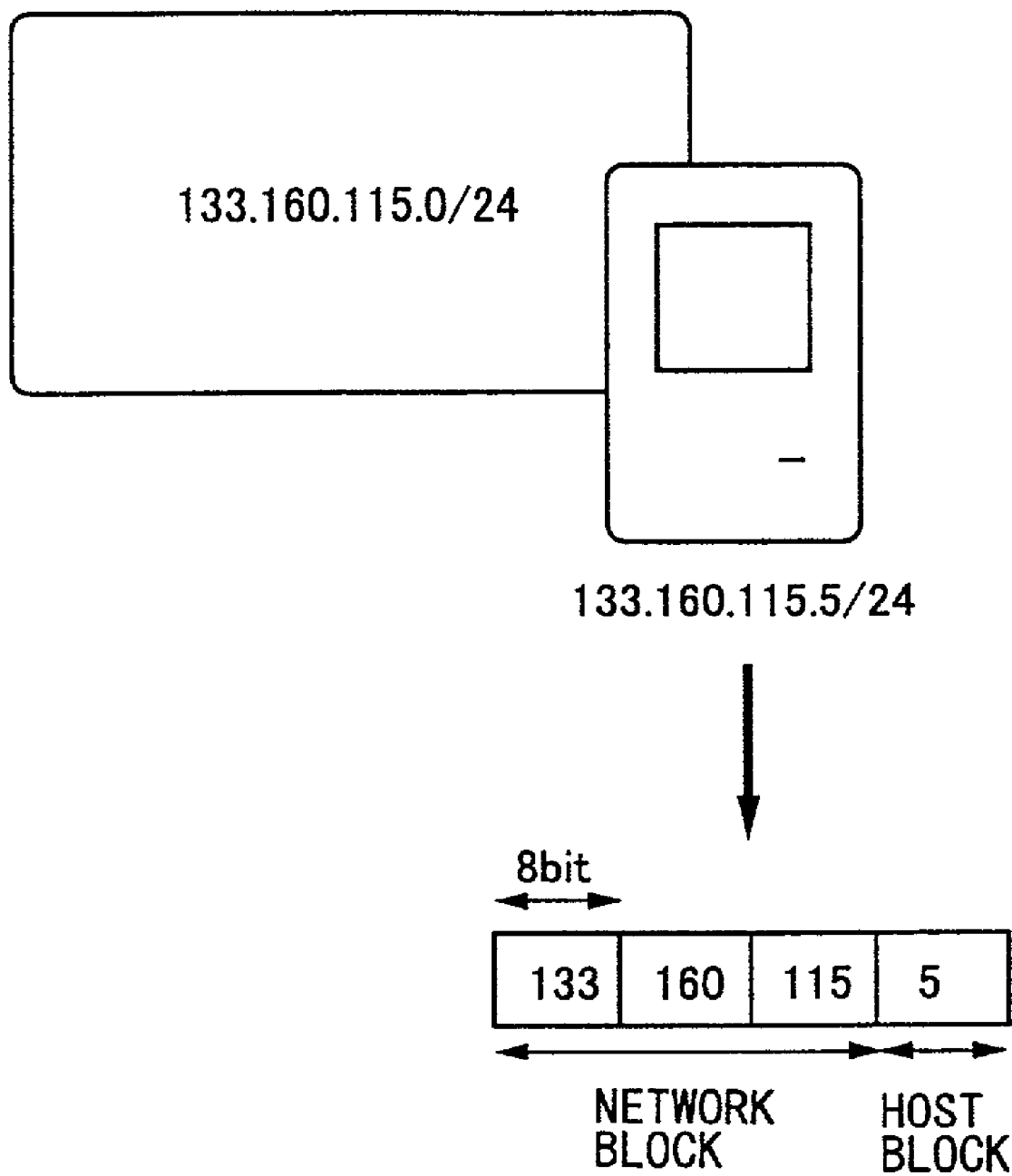
FIG. 1 is a drawing showing a structure of an IP address of IPv4.
Figure 2:
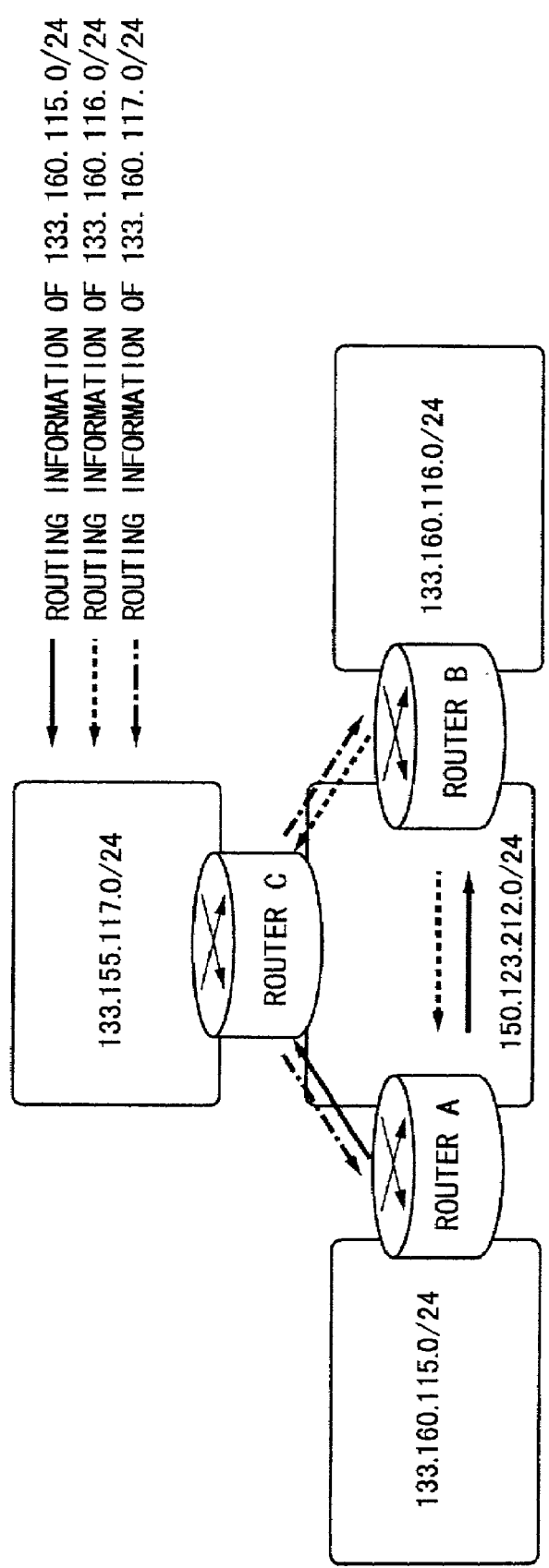
FIG. 2 is a drawing showing an exchange of routing information.
Figure 3:
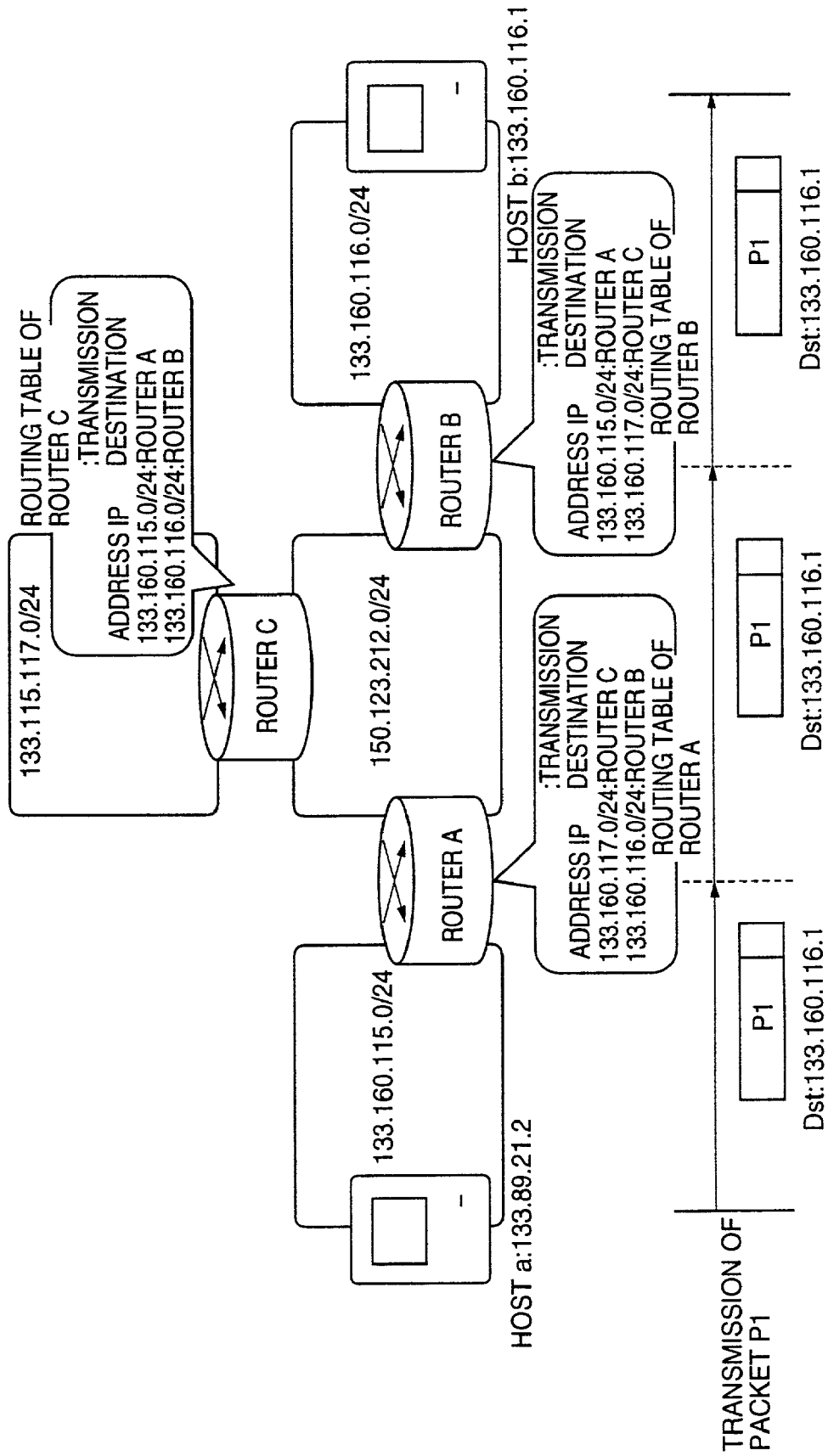
FIG. 3 is a drawing showing an example of a packet relay in a network for which routing information shown in FIG. 2 has been exchanged.
Figure 4:
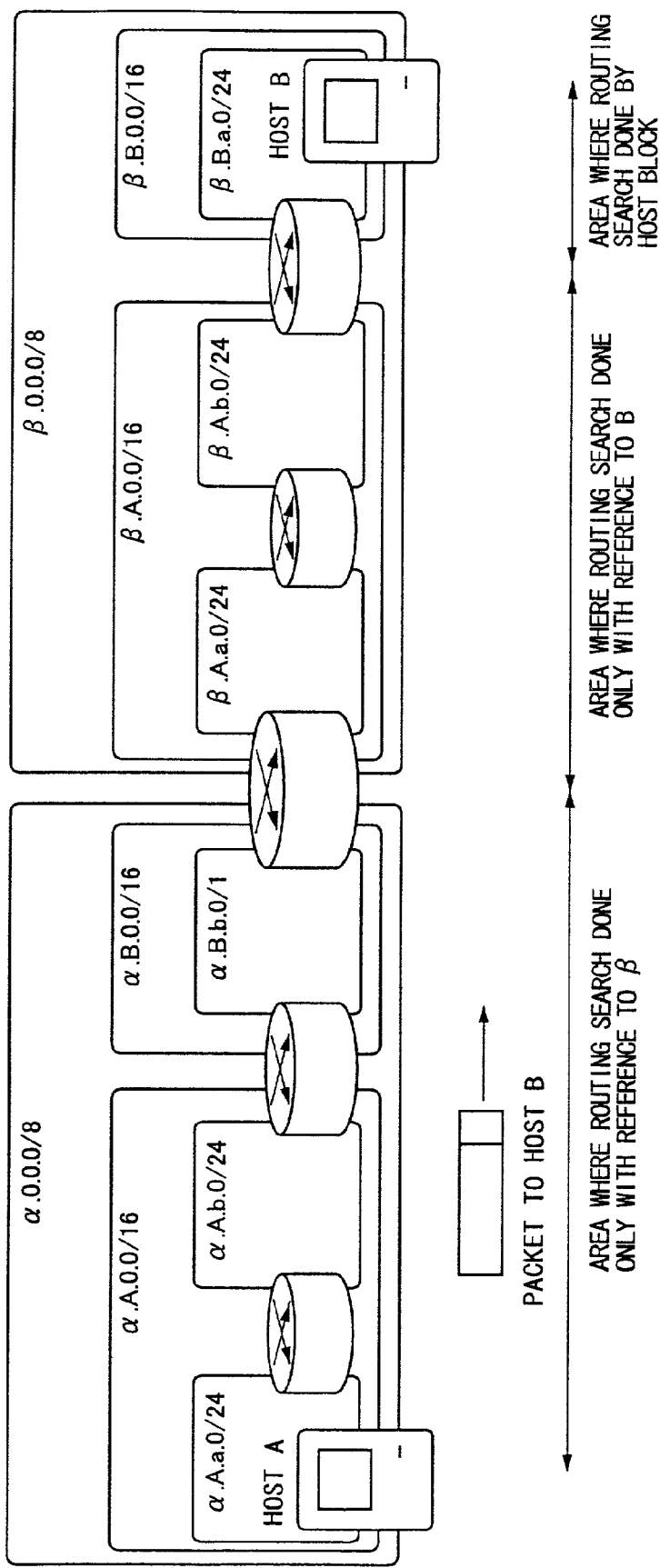
FIG. 4 is a drawing showing a hierarchical network based on structure of an IP address.
Figure 7:
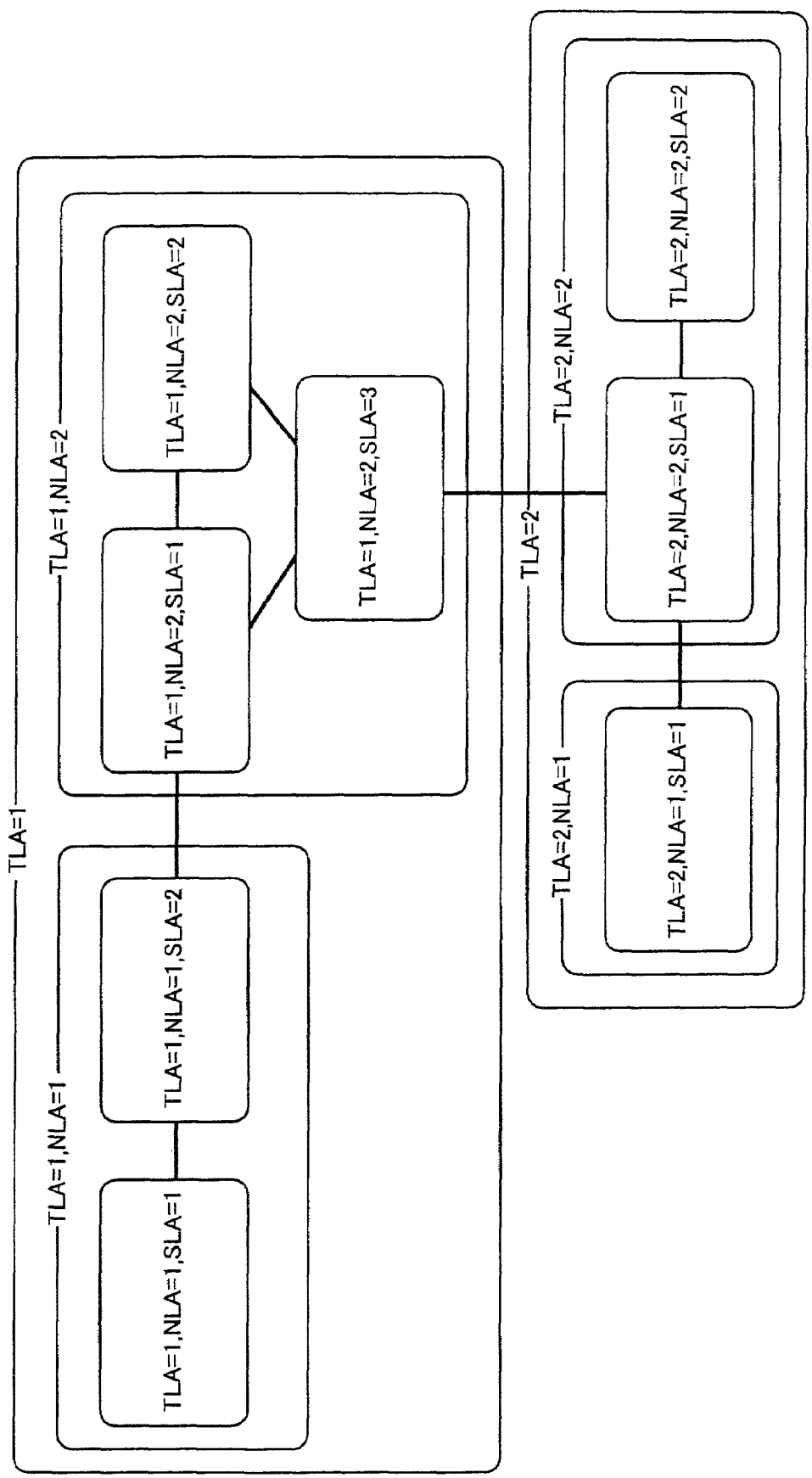
FIG. 7 is a drawing showing an example of a structure of the hierarchical network that uses IPv6.
Figure 8:
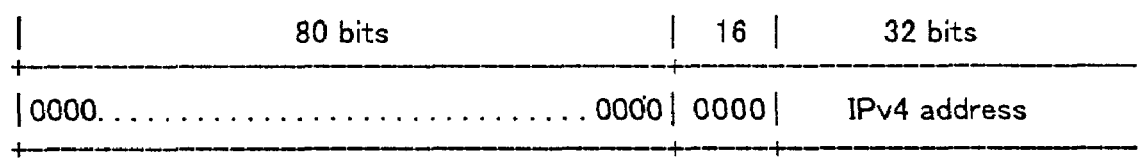
FIG. 8 is a drawing showing an address format that maps an IPv4 address to an IPv6 address.
Figure 9:
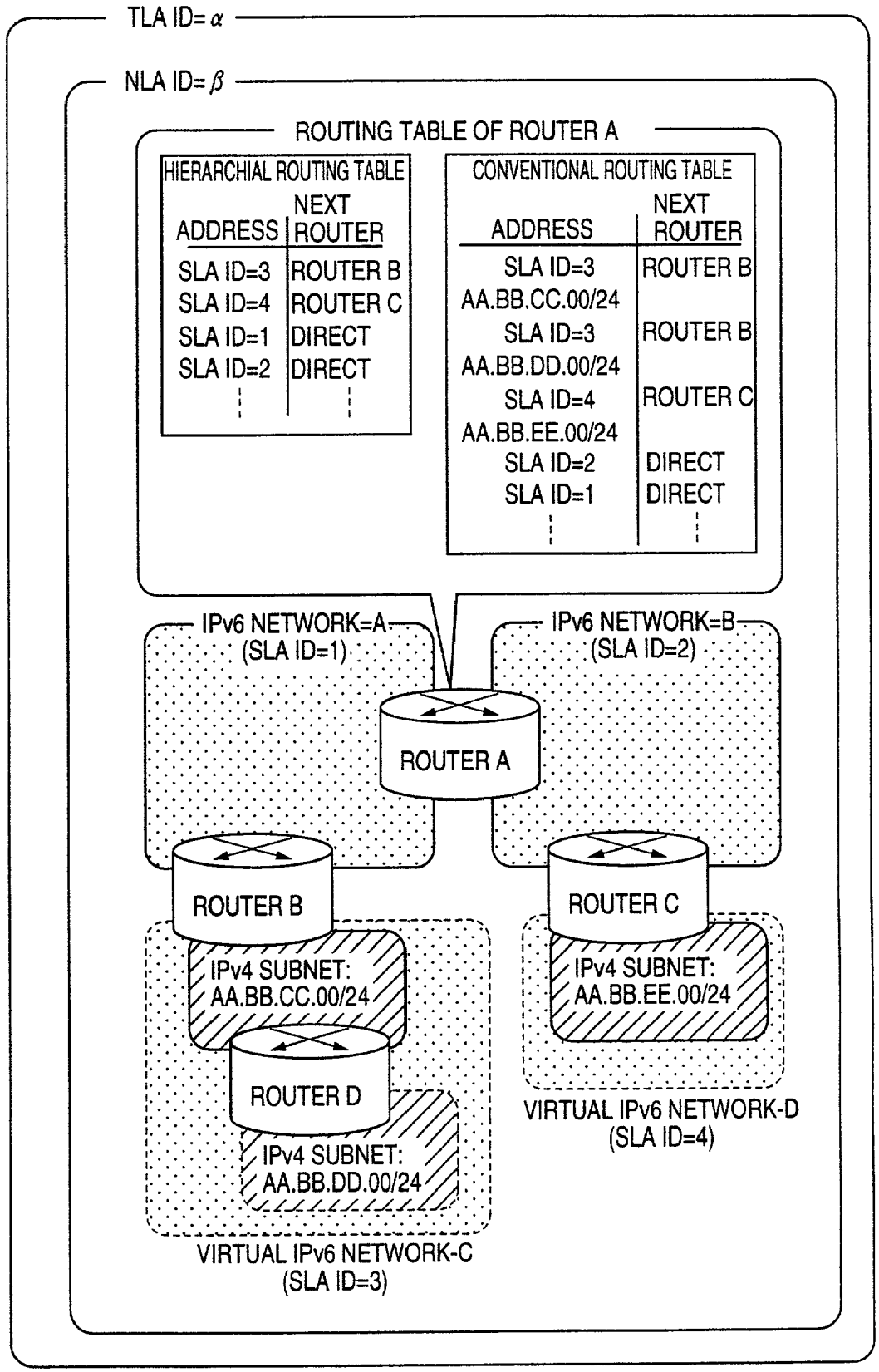
FIG. 9 is a network block diagram of an embodiment of a mixed environment of a hierarchical network and a non-hierarchical network, to which the present invention is applied.

FIG. 9 shows a network block diagram of an embodiment of a mixed environment of a hierarchical network and a non-hierarchical network, to which the present invention is applied. In the present invention, an IPv4 network is treated as if it were a hierarchical IPv6 network, wherein a router located at a boundary of the IPv4 network and the IPv6 network assigns a virtual hierarchy of the IPv6 network to the IPv4 network. A router B assigns SLAID=3 to an IPv4 network on the left-hand side of the drawing, while a router C assigns SLAID=4 to an IPv4 network on the right-hand side. These assignments are performed by a technique, such as user operation, and this virtual hierarchy realizes the same hierarchical routing control as with IPv6 networks.

In addition, a host/router in the IPv4 network will not be aware of the virtual hierarchy, except for the router B and the router C. However, when the IPv6 network groups routing information, the IPv4 network cannot transmit routing information through the IPv6. For example, if routing information on an address AA.BB.CC.00/24, and an address AA.BB.DD.00/24 are grouped into SLAID=3, the routing information will not be transmitted to an address AA.BB.EE.00/24. In a network structured by only IPv4 networks, automatic grouping of routing information as above is not performed.

For this reason, two means are used in this embodiment, as follows. In addition, in this embodiment, an IP network is targeted.

First, a router in the IPv6 network is provided with two kinds of routing tables, one being a conventional routing table that does not perform grouping of routing by hierarchy, and the other being a hierarchical routing table that performs grouping by routing hierarchy. For example, the router in the IPv6 network uses the hierarchical routing table when performing a high-speed routing search by hierarchy, and uses the conventional routing table for exchange of routing information when the hierarchical routing table does not work due to the grouping of the routing information.

Second, an address format which embeds an IPv4 address into an interface ID of an IPv6 address is specified as an address format that indicates virtual hierarchy information assigned to the IPv4 network and the IPv4 network address, without using a conventional IPv4 compatible IPv6 address. For example, routing information of AA.BB.CC.00 shown in FIG. 9 is handled as "TLAID=α, NLAID=β, SLAID=3, and interface ID=AA.BB.CC.00" in the IPv6 network. Therefore, in the IPv6 network, an IPv6 address shown in FIG. 5 and a virtual IPv6 address that is an IPv4 address to which a virtual hierarchy is assigned are intermingled. FIGS. 10 (A), (B), and (C) show structure of an IPv6 network address, a hierarchy compliant IPv4 compatible IPv6 network address, and an IPv6 host address, respectively.

Two kinds of addresses above are identified in a procedure that follows. As shown in FIG. 10 (A), when the interface ID is "All 0", it is identified as a network address of IPv6. Moreover, as shown in FIG. 10 (B), when the highest 32 bits of the interface ID are 0, it is identified as the network address of IPv4 that is made virtually hierarchical. Otherwise, it is identified as the IPv6 host address, as shown in FIG. 10 (C).

Figure 11:
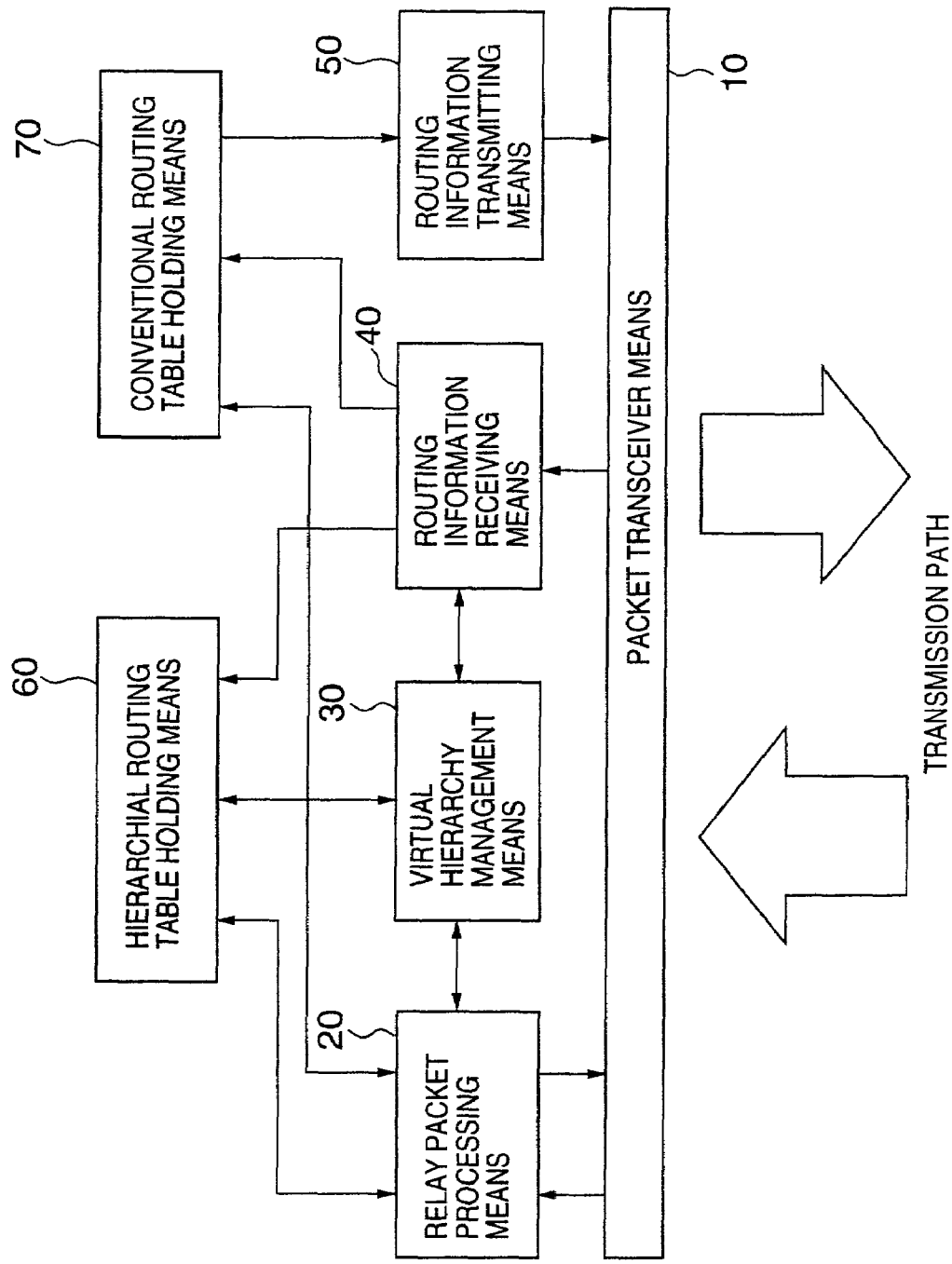
FIG. 11 is a block diagram of an embodiment of the present invention, showing a virtual hierarchy compliant router as a routing control apparatus in a mixed environment of a hierarchical network and a non-hierarchical network.

FIG. 11 is a block diagram of an embodiment of a virtual hierarchy compliant router of the embodiment of the present invention, which is a routing control apparatus in the mixed environment of the hierarchical network and the non-hierarchical network. In addition, the routers A, B, and C shown in FIG. 9 are the virtual hierarchy compliant routers, and a router D is a conventional IPv4 router.

The router B as shown in FIG. 11 assigns a virtual hierarchy SLAID=3 to an IPv4 network of AA.BB.CC.00/24 and an IPv4 network of AA.BB.DD.00/24. To an IPv4 network AA.BB.EE.00/24, a virtual hierarchy SLAID=4 is similarly assigned by the router C.

The virtual hierarchy compliant router includes packet transceiver means 10, packet relay processing means 20, virtual hierarchy management means 30, routing information receiving means 40, routing information transmitting means 50, hierarchical routing table holding means 60, and conventional routing table holding means 70, as shown in FIG. 11.

Figure 12:
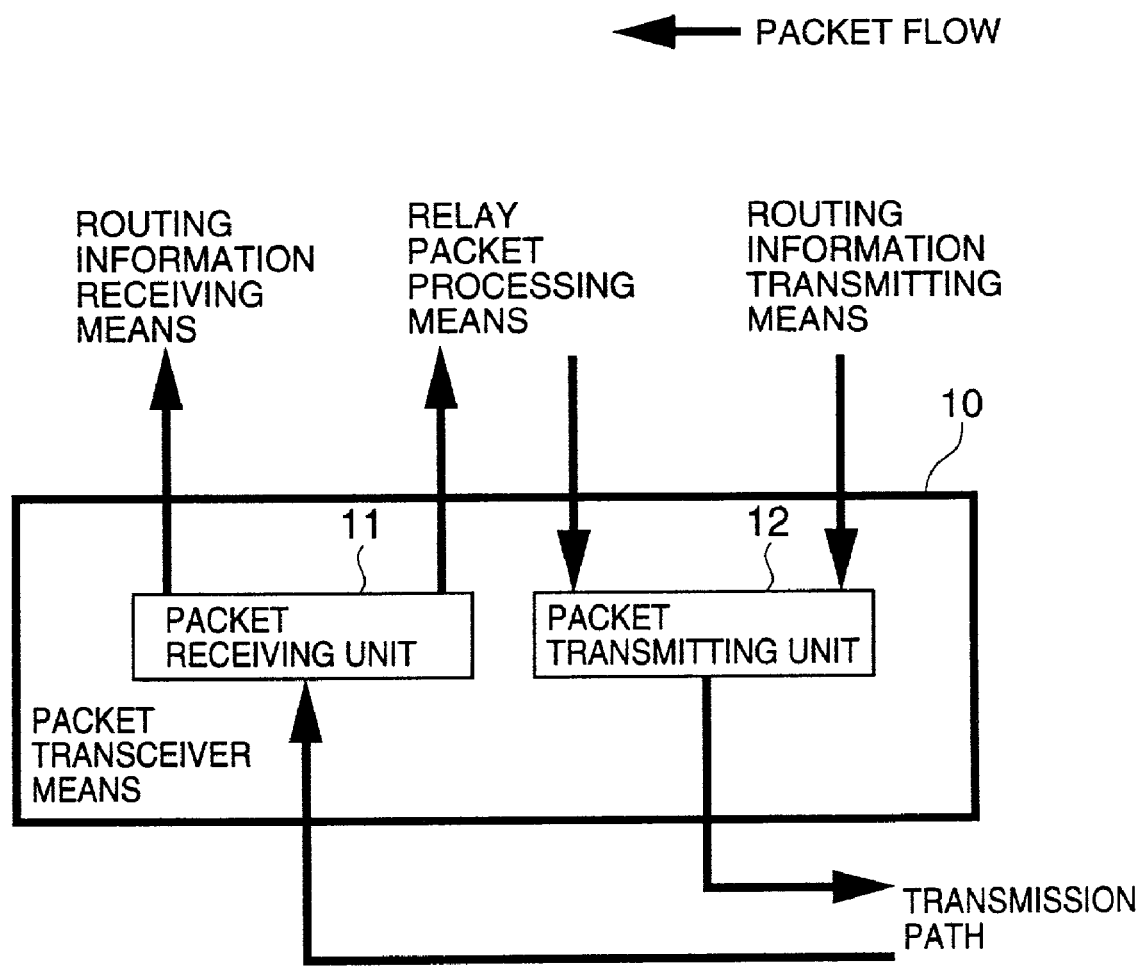
FIG. 12 is a block diagram of an embodiment of a packet transceiver means 10.

The packet transceiver means 10 is a means for transmitting and receiving an IP packet. FIG. 12 is a block diagram of an embodiment of the packet transceiver means 10, and the packet transceiver means 10 includes a packet receiving unit 11 and a packet transmitting unit 12. The packet receiving unit 11, a unit for receiving an IP packet, passes the received packet to the routing information receiving means 40 with a receiving interface name, if the received packet from a transmission path contains routing information, and, otherwise, passes the received packet to the packet relay processing means 20 with the receiving interface name. The packet transmitting unit is a unit for transmitting an IP packet, and transmits a packet passed from the routing information transmitting means 50 or from the packet relay processing means 20 to a transmission path.

Figure 13:
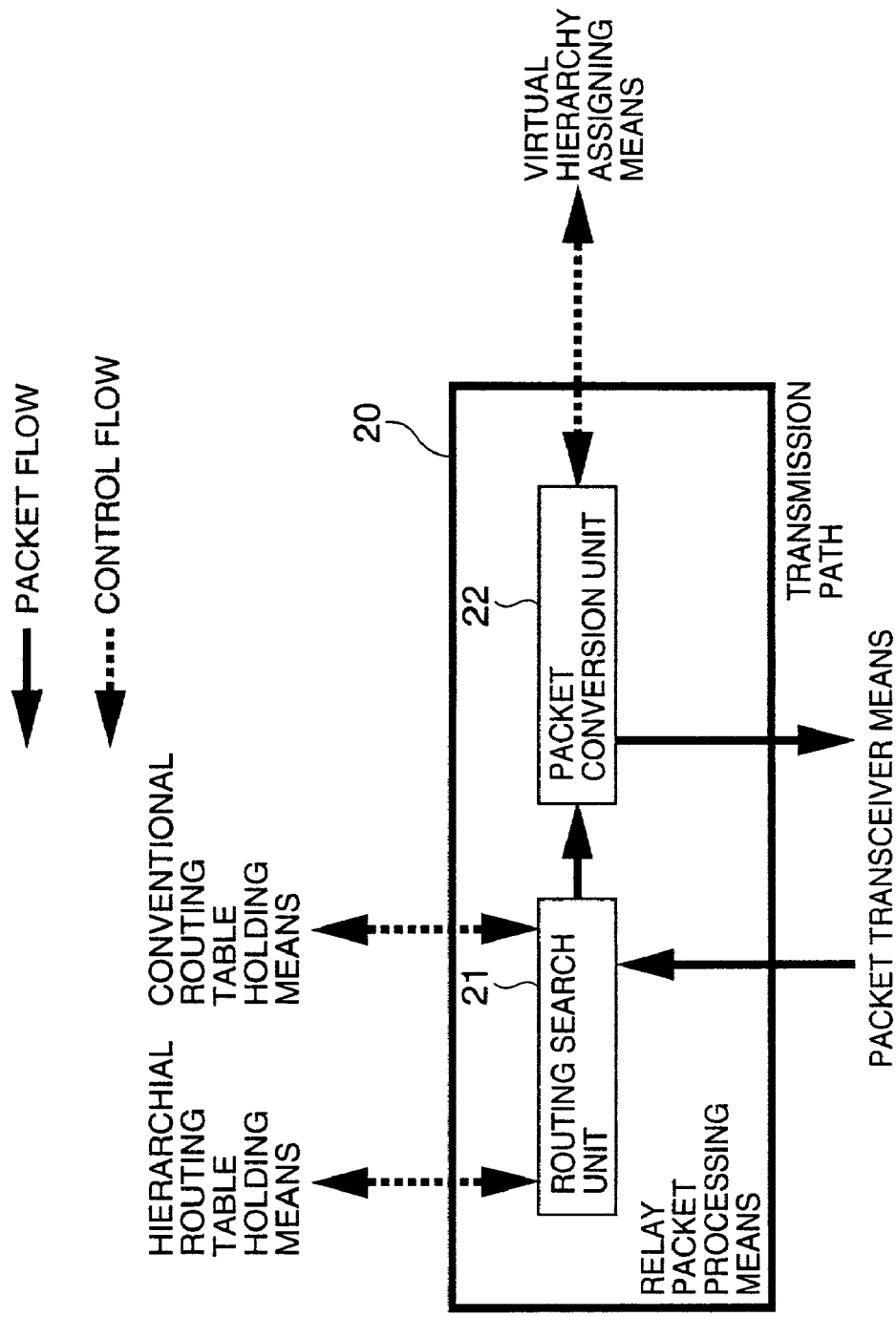
FIG. 13 is a block diagram of an embodiment of a packet relay processing means 20.

The packet relay processing means 20 is a means to perform routing search for relay processing of a packet. FIG. 13 is a block diagram of an embodiment of the packet relay processing means 20, and the packet relay processing means 20 includes a routing search unit 21 and a packet conversion unit 22. The routing search unit 21 determines a router or a host to which the packet is to be sent, based on a destination address of a packet which was passed from the packet receiving unit 11 and to be relayed, in a procedure that follows.

First, when a packet to be relayed arrives at a router from an IPv4 network, routing search by the conventional routing table holding means 70 is performed.

Next, when a packet to be relayed arrives at the router from an IPv6 network, routing search by the hierarchical routing table holding means 60 is performed. Further, a result of the routing search and the packet to be relayed are passed to the packet conversion unit 22.

The packet conversion unit 22 performs packet conversion in a procedure that follows, provides a next receiving party to the packet transmitting unit 12 of the packet transceiver means 10, and passes the packet that has been converted.

As for a packet to be relayed from an IPv4 network to an IPv6 network, a format conversion of the addresses of receiving party and sending party with a virtualization compliant IPv4 compatible IPv6 address is performed, thereby an IPv6 packet is generated out of the IPv4 packet. In addition, in order to obtain a virtual hierarchy number at this time, an inquiry is made to the virtual hierarchy management means 30.

As for a packet to be relayed from the IPv6 network to the IPv4 network, a format conversion of addresses of the sending party and the receiving party is performed with an IPv4 address of the interface ID of the virtualization compliant IPv4 compatible IPv6 address, thereby an IPv4 packet is generated out of the IPv6 packet. Further, no conversion shall be performed on packets to be relayed other than packets to be relayed from the IPv4 network to the IPv6 network, and from the IPv6 network to the IPv4 network.

Figure 14:
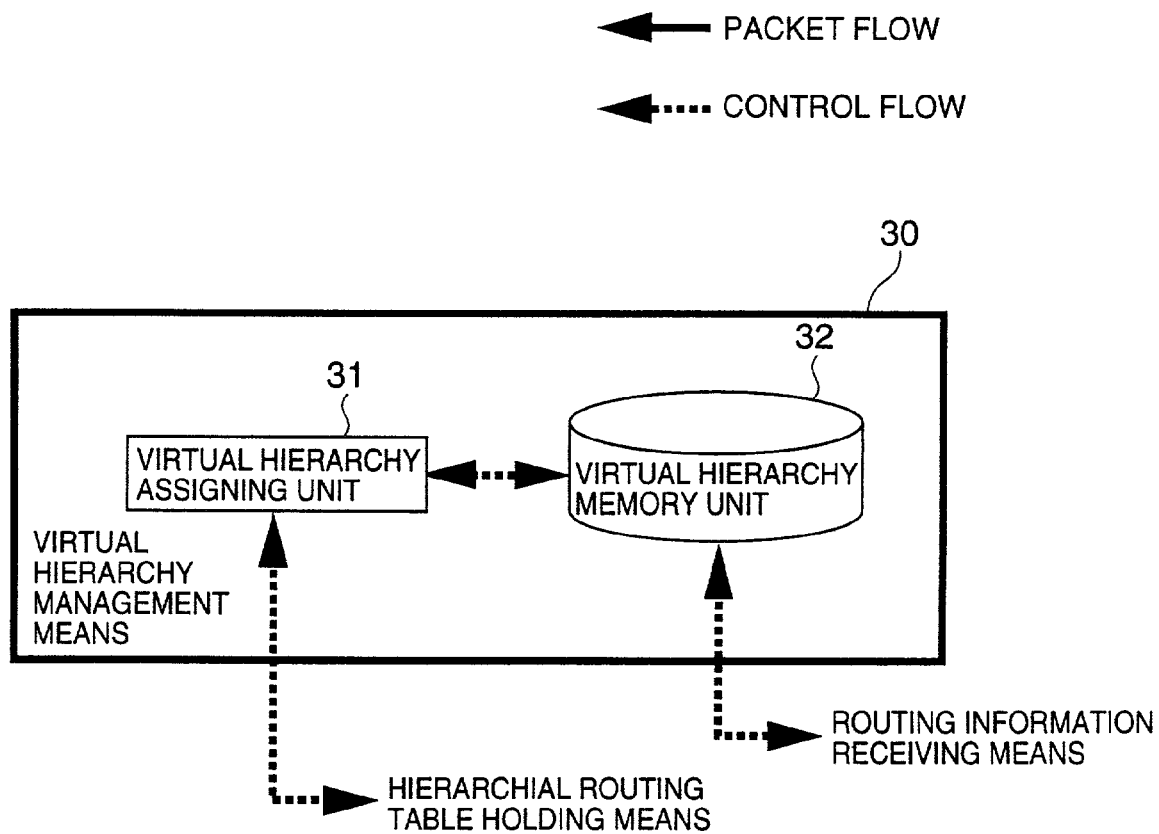
FIG. 14 is a block diagram of an embodiment of a virtual hierarchy management means 30.

The virtual hierarchy management means 30 is a means to virtually assign an IPv6 hierarchy to the IPv4 network. FIG. 14 is a block diagram of an embodiment of the virtual hierarchy management means 30, which includes a virtual hierarchy assigning unit 31 and a virtual hierarchy memory unit 32. The virtual hierarchy assigning unit 31 assigns virtual hierarchy information to each interface that accommodates an IPv4 network by a user operation and the like, and the virtual hierarchy memory unit 32 stores the information. Further, the hierarchy information for an IPv4 network is written into the hierarchical routing table holding means 60. The virtual hierarchy memory unit 32 stores the virtual hierarchy information that has been assigned by the virtual hierarchy assigning unit 31.

Figure 15:
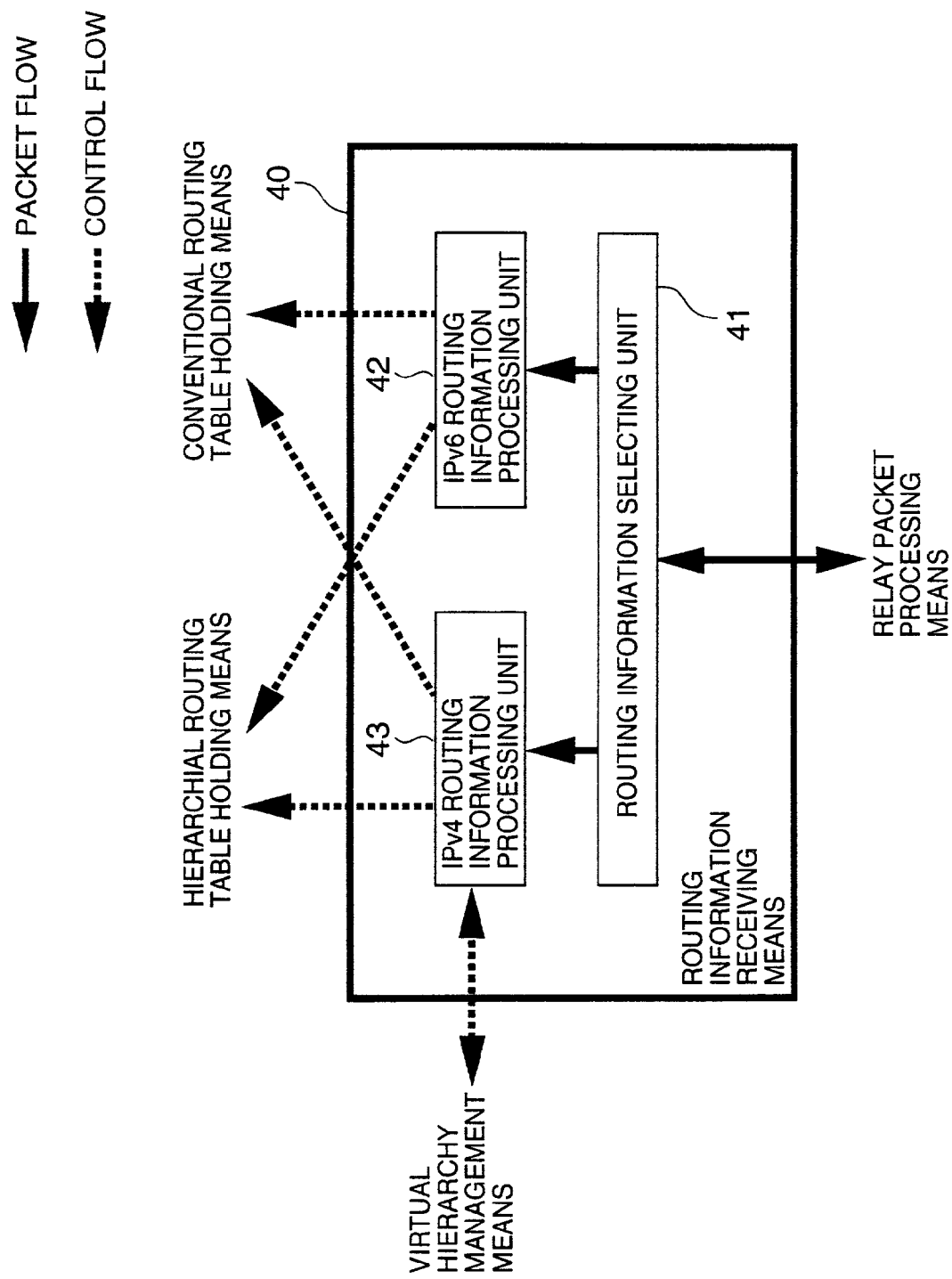
FIG. 15 is a block diagram of an embodiment of a routing information receiving means 40.

The routing information receiving means 40 generates two tables, a conventional routing table and a hierarchical routing table, based on the routing information received from an adjacent router. FIG. 15 is a block diagram of an embodiment of the routing information receiving means 40, which includes a routing information selection unit 41, an IPv6 routing information processing unit 42, and an IPv4 routing information receiving unit 43. The routing information selection unit 41 determines whether a routing information packet received from the packet transceiver unit 10 is a routing information packet received from an IPv6 network or a routing information packet received from an IPv4 network, based on the receiving interface of the routing information packet. In the former case, the packet is passed to the IPv6 routing information receiving unit 42, and in the latter case, it is passed to the IPv4 routing information processing unit 43.

The IPv6 routing information processing unit generates a routing table from the routing information received from the IPv6 network. For example, in FIG. 9, router A receives the routing information from the router B. Here, a routing table of each entry of routing information is generated as follows. As for a routing information entry of an IPv6 network, hierarchy information is collected and a conventional routing table and a hierarchical routing table are generated.

As for a routing information entry of an IPv4 network, i.e., a virtualization compliant IPv4 compatible IPv6 address, a hierarchical routing table is generated by combining entries based on virtual hierarchy numbers, and a conventional routing table is generated without combining entries. For example, in FIG. 9, when the router A receives routing information about an IPv4 network on the right-hand side from the router B, two entries of address AA.B-B.CC.0.0/24, and address AA.BB.DD.00/24 are generated in the conventional routing table of the router A, and only one entry is generated in the hierarchical routing table, grouping them into SLAID=3.

The IPv4 routing information processing unit 43 generates a routing table from routing information received from the IPv4 network. An example of this case is shown in FIG. 9, by the router B receiving routing information from the router D. Here, the routing table of each entry of routing information is generated as follows. To each entry of routing information, a virtual hierarchy number corresponding to an interface from which the routing information is received is obtained from the virtual hierarchy memory unit 32 of the virtual hierarchy setting means 30 and a conventional routing table is generated without grouping by the hierarchy number.

Figure 16:
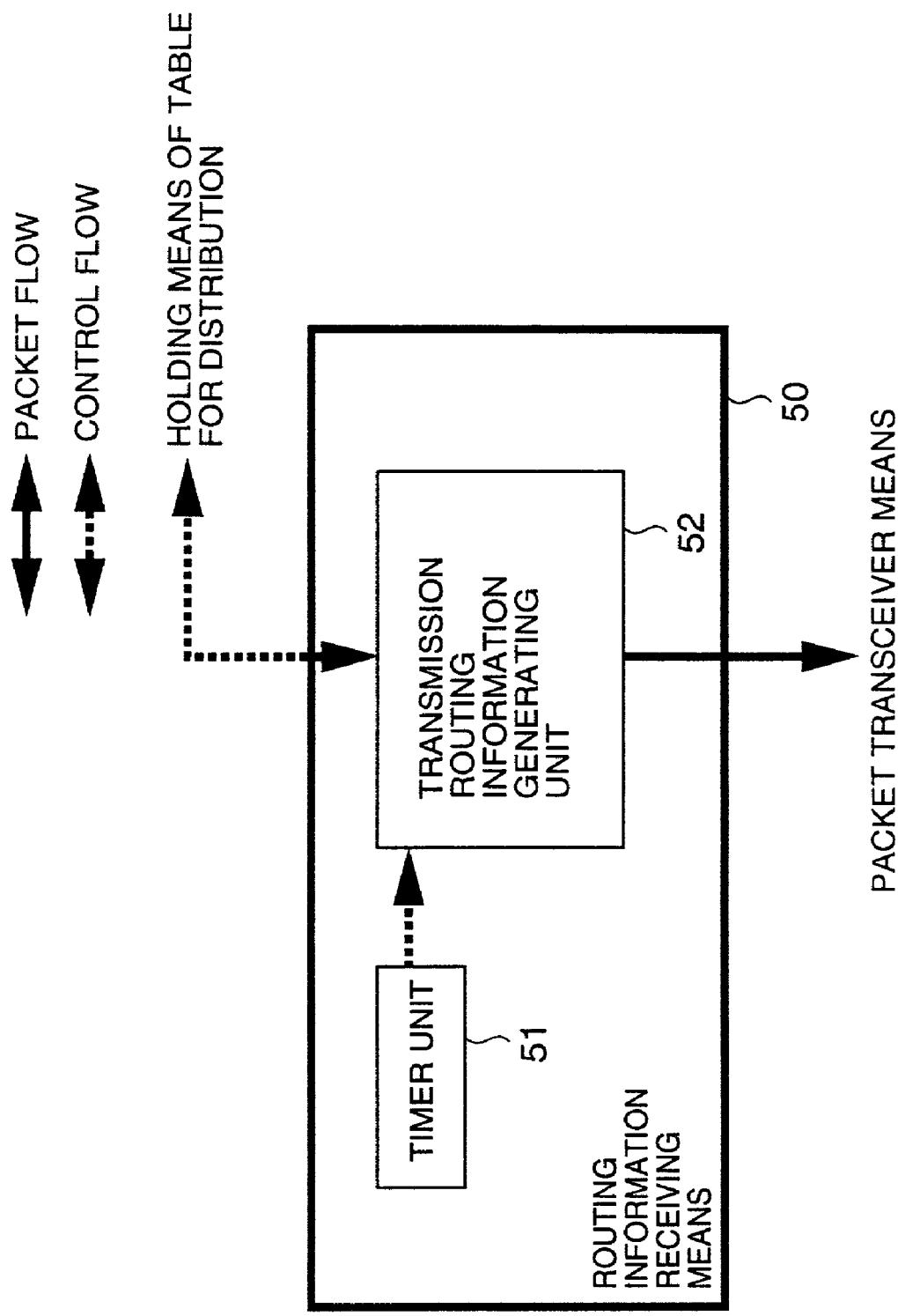
FIG. 16 is a block diagram of an embodiment of a routing information transmitting means 50.

The routing information transmitting means 50 is a means to transmit routing information to an adjacent router or a host. FIG. 16 is a block diagram of an embodiment of the routing information transmitting means 50, which includes a timer unit 51 and a transmitting routing information generating unit 52. The timer unit 51 supplies a direction to transmit routing information at every fixed time to the transmitting routing information generating unit 52 with an address of a receiver of the routing information. The transmitting routing information generating unit 52, upon receiving the direction from the timer unit 51, generates routing information from the conventional routing table holding means 70, and transmits to the address of the receiver via the packet transceiver unit 10.

Figure 17:
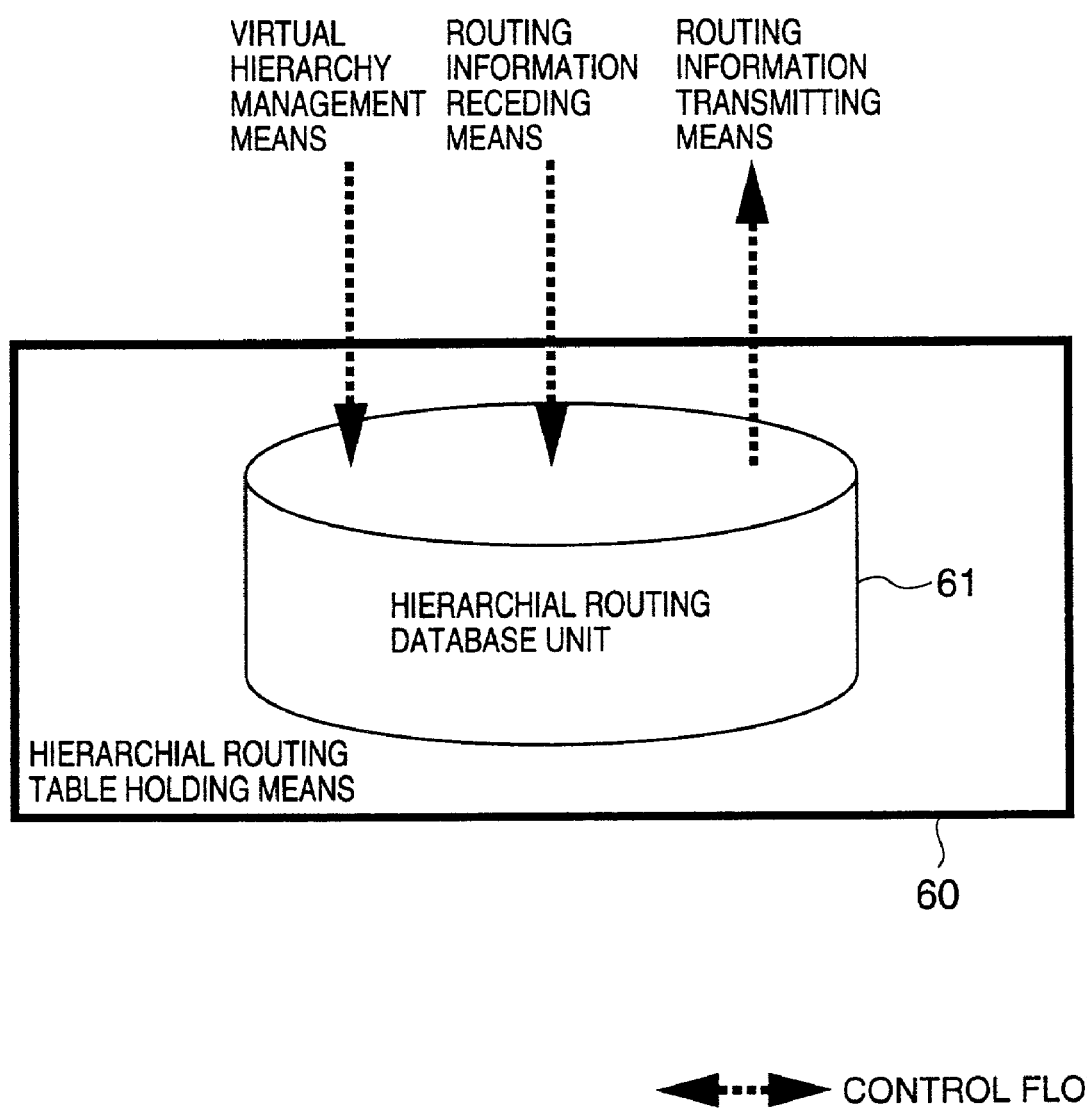
FIG. 17 is a block diagram of an embodiment of a hierarchical routing table holding means 60.

The hierarchical routing table holding means 60 is a means to hold hierarchy compliant routing information. FIG. 17 is a block diagram of an embodiment of the hierarchical routing table holding means 60 which includes a hierarchical routing database unit 61. The hierarchical routing database unit 61 is a database unit that stores the routing information generated by the IPv4 routing information processing unit 43 and the IPv6 routing information processing unit 42, and searches a next transmitting router or a host, with hierarchy information being a search key.

Figure 18:
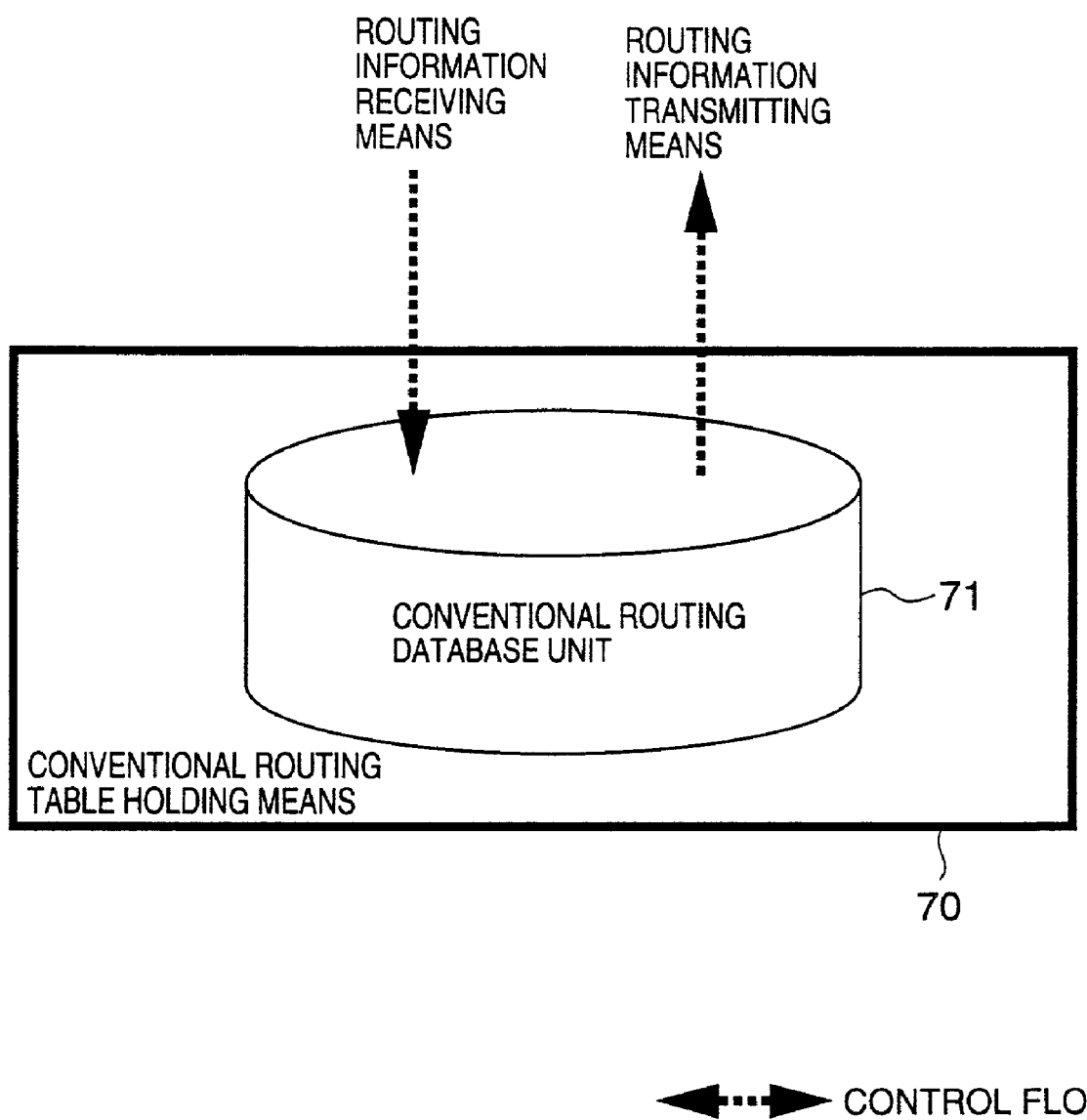
FIG. 18 is a block diagram of an embodiment of a conventional routing table holding means 70.

The conventional routing table holding means 70 is a means to store the routing information referred to when hierarchical routing search is not performed. FIG. 18 is a block diagram of an embodiment of the conventional routing table holding means 70 which includes a conventional routing database unit 71. The conventional routing database unit 71 is a database unit that stores the routing information generated in the IPv4 routing information processing unit 43, and searches a next transmitting router or a host, with the destination address being a search key.

Figure 19:
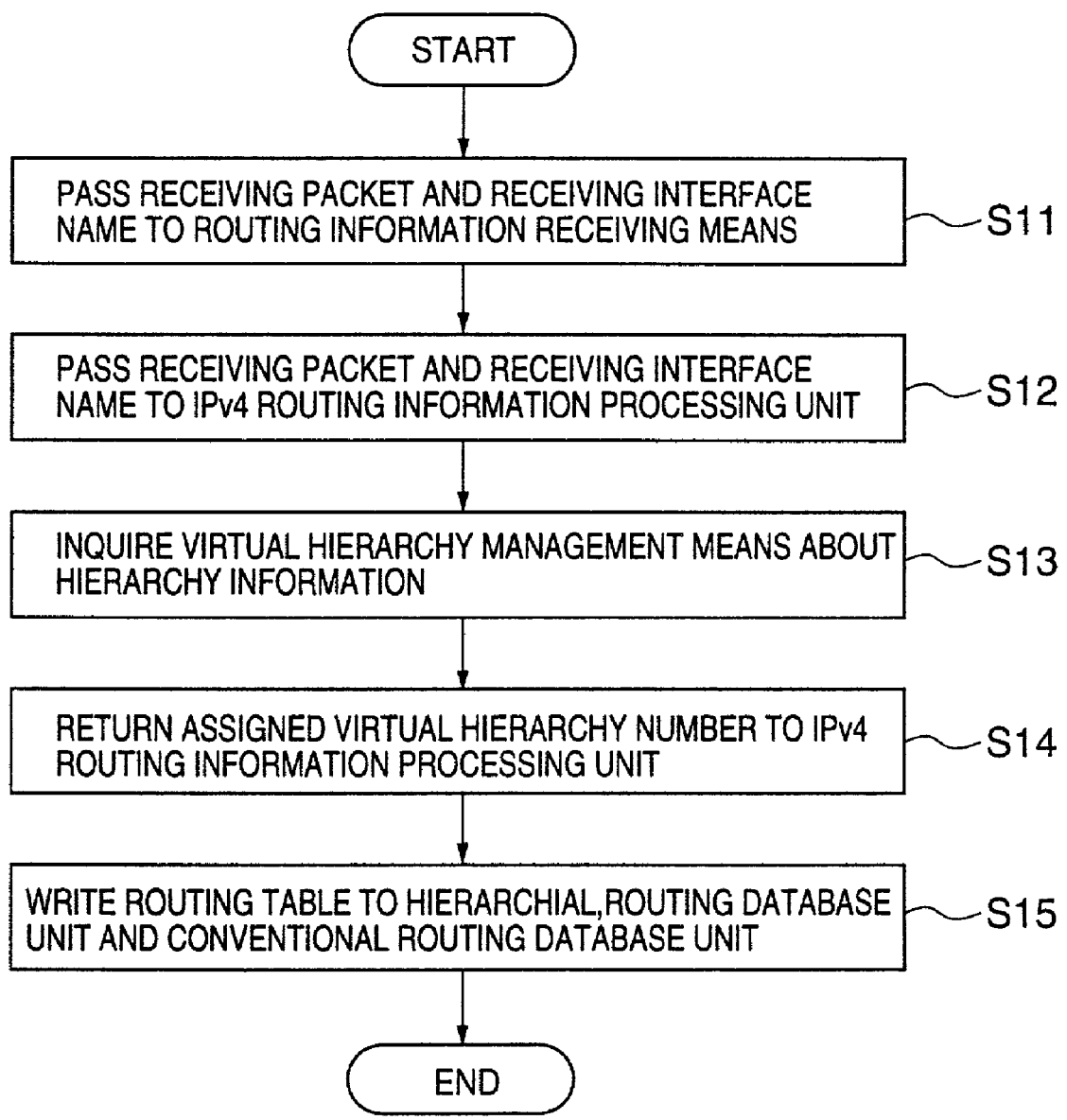
FIG. 19 is a flowchart of an embodiment of a process of routing information reception from an IPv4 network.

Next, a process of routing information from an IPv4 network, performed by the virtual hierarchy compliant router of the present invention, will be described. FIG. 19 is a flowchart of an embodiment of the process of routing information reception from an IPv4 network.

Step S11. The packet receiving unit 11 of the packet transceiver means 10, which receives a routing information packet, passes the packet and a receiving interface name to the routing information receiving means 40.

Step S12. The routing information selection unit 41 of the routing information receiving means 40 determines based on the receiving interface name of the routing information packet that the routing information is from an IPv4 network and the packet is passed to the IPv4 routing information processing unit 43 with the receiving interface name.

Step S13. The IPv4 routing information processing unit 43 asks the virtual hierarchy memory unit 32 of the virtual hierarchy management means 30 about hierarchy information assigned to the IPv4 network by the receiving interface name.

Step S14. The virtual hierarchy memory unit 32 returns to the IPv4 routing information processing unit 43 a virtual hierarchy number assigned to the IPv4 network by the virtual hierarchy assigning unit 31.

Step S15. The IPv4 routing information processing unit 43 takes the routing information from the IPv4 network as if it were routing information from an IPv6 network of the hierarchy of the search result of step S14, and writes the routing table in the hierarchical routing database unit 61 of the hierarchical routing table holding means 60. Furthermore, the IPv4 routing information processing unit 43 writes the routing information, without grouping together by the hierarchy number, in the conventional routing database unit 71 of the conventional routing table holding means 70 with the virtual hierarchy number of the IPv6 network of the search result of step S14.

Through the procedure as above, the routing table is built in the hierarchical routing table holding means 60 and the conventional routing table holding means 70 from the routing information received from the IPv4.

Figure 20:
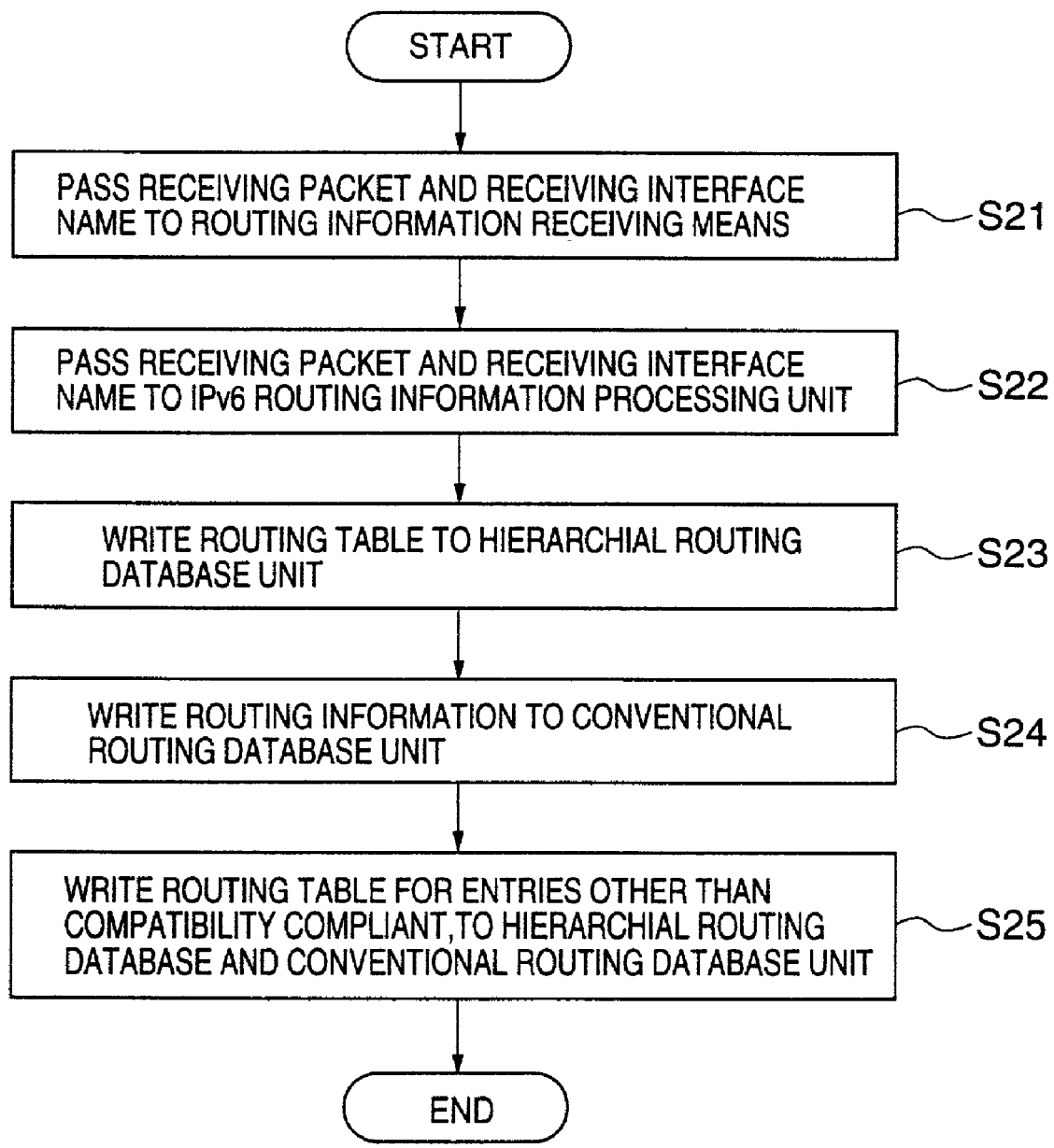
FIG. 20 is a flowchart of an embodiment of a process of routing information reception from an IPv6 network.

Next, the process of routing information reception from the IPv6 network, which the virtual hierarchy compliant router of the present invention performs, will be described. FIG. 20 is a flowchart of an embodiment of the process of the routing information reception from the IPv6 network.

Step S21. The packet receiving unit 10 that is a packet transceiver means of a received routing information packet, passes the packet and a receiving interface name to the routing information receiving means 40.

Step S22. The routing information selection unit 41 of the routing information receiving means 40 determines that the routing information is from the IPv6 network by the receiving interface name of the routing information packet, and transmits the packet to the IPv6 routing information processing unit 42, with the receiving interface name.

Step S23. The IPv6 routing information processing unit 42 collects routing information in the format of the virtualization compliant IPv4 compatible IPv6 address from entries of the IPv6 network by virtual hierarchy numbers, and writes a routing table that includes a next relaying point and its transmitting interface by using the hierarchy number as a key into the hierarchical routing database unit 61 of the hierarchical routing table holding means 60.

Step S24. The IPv6 routing information processing unit 42 further writes routing information indicative of the relaying point and its transmitting interface, with a subnet number of each IPv4 subnet and virtual hierarchy information as keys, without grouping the routing information by virtual hierarchy into the conventional routing database unit 71 of the conventional routing table holding means 70.

Step S25. As to entries other than the virtualization compliant IPv4 compatible IPv6 addresses among the entries of routing information, hierarchy information is collected and the routing table is generated in the conventional routing table holding means 70 and the hierarchical routing table holding means 60.

By the above procedure, a routing table is generated in the hierarchical routing table holding means 60 and the conventional routing table holding means 70 from the routing information received from the IPv6.

Figure 21:
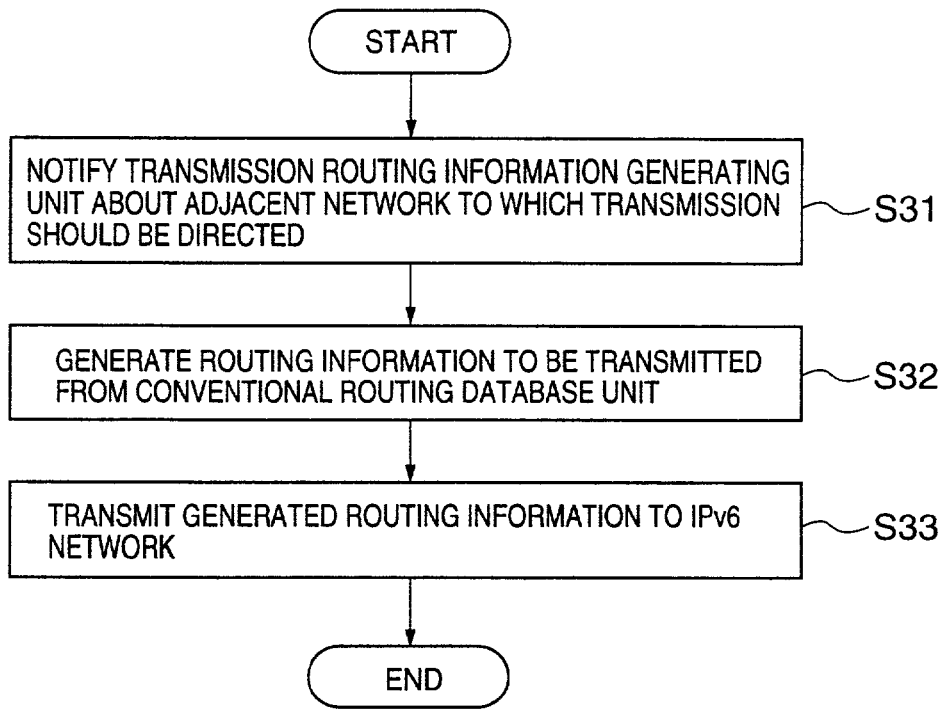
FIG. 21 is a flowchart of an embodiment of a process of routing information transmission to an IPv6 network.

Next, a process of routing information transmission to the IPv6 network, which the virtual hierarchy compliant router of the present invention performs, will be described. FIG. 21 is a flowchart of an embodiment of the process of the routing information transmission to the IPv6 network.

Step S31. The timer unit 51 in the routing information transmitting means 50 at a fixed interval provides the transmitting routing information generating unit 52 about adjacent networks to which routing information should be transmitted.

Step S32. When an adjacent network is an IPv6 network, the transmitting routing information generating unit 52 generates the routing information to be transmitted in a procedure that follows from the conventional routing database unit 71 of the conventional routing table holding means 70.

(a) In the case of transmitting routing information to an adjacent network which has a higher hierarchy, such as when NLAID is different, routing information in the conventional routing database unit 71 below the different hierarchy is grouped into one routing information entry. For example, when transmitting the routing information from NLAID=1 to a network of NLAID=2, the routing information on each SLAID belonging to NLAID=1 is not passed, but is grouped into NLAID=1, and treated as one routing information entry.

(b) In the case of transmitting routing information to an adjacent network of the same hierarchy, an entry of routing information to each of the contents of the conventional routing database unit 71 is generated. In other words, it does not perform grouping of the entries in the database unit.

Step S33. The generated routing information is transmitted to the IPv6 network via the packet transceiver unit 10.

Figure 22:
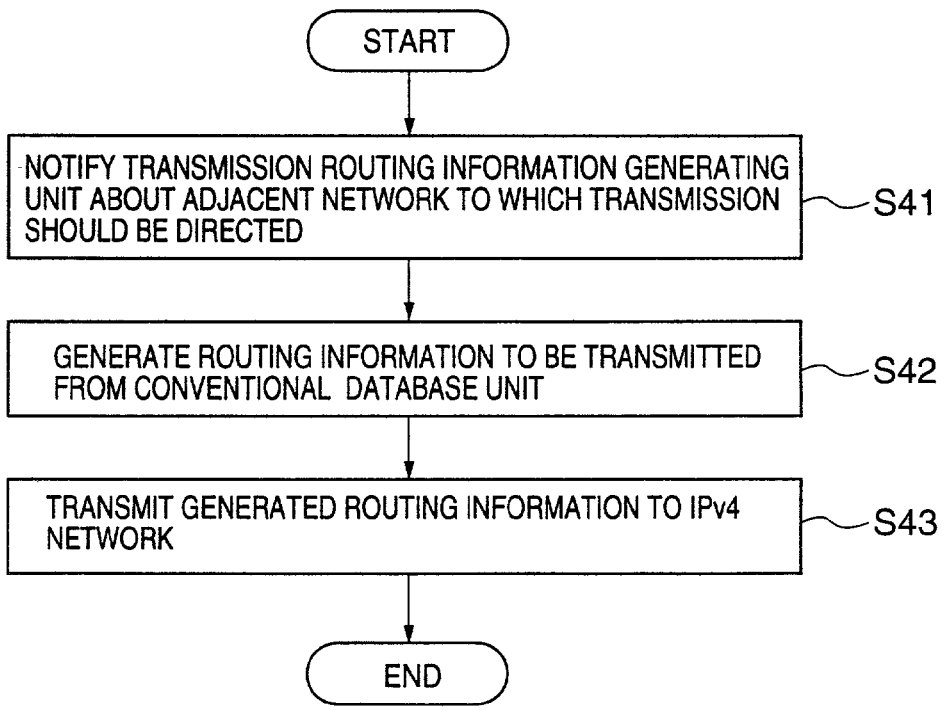
FIG. 22 is a flowchart of an embodiment of a process of routing information transmission to an IPv4 network.

Next, a process of routing information transmission to the IPv4 network, which the virtual hierarchy compliant router of the present invention performs, will be described. FIG. 22 is a flowchart of an embodiment of the process of the routing information transmission to the IPv4 network.

Step S41. The timer unit 51 of the routing information transmitting means 50 at a fixed interval provides the transmission routing information generating unit 52 about routing information to be transmitted to an adjacent network.

Step S42. In the case that the adjacent network is an IPv4 network, the transmitting routing information generating unit 52 generates transmission routing information in a procedure that follows from the conventional routing database unit 71 of the conventional routing table holding means 70.

(a) When an entry of the conventional routing database unit 71 is a virtualization compliant IPv4 compatible IPv6 address of the IPv6, the routing information is generated by extracting an IPv4 address from the interface ID block of the entry.

(b) When the entry of the conventional routing database unit 71 is other than the virtualization compliant IPv4 compatible IPv6 address of the IPv6, the entry will not be included in the routing information, because the IPv4 network cannot handle the IPv6 routing information.

(c) In order that an IPv4 network may communicate with an IPv6 network, a default router is made entered as the transmitting router. Here, the default router is a router that transmits to a destination address that is not contained in the entry of the routing information. That is, even if a routing entry to an IPv6 network is not contained in the transmitting routing information, communication from an IPv4 network to an IPv6 network is realizable so long that the default router is a router located at the boundary of an IPv6 network.

Step S43. The routing information generated as above is transmitted to the IPv4 network via the packet transceiver unit 11.

Figure 23:
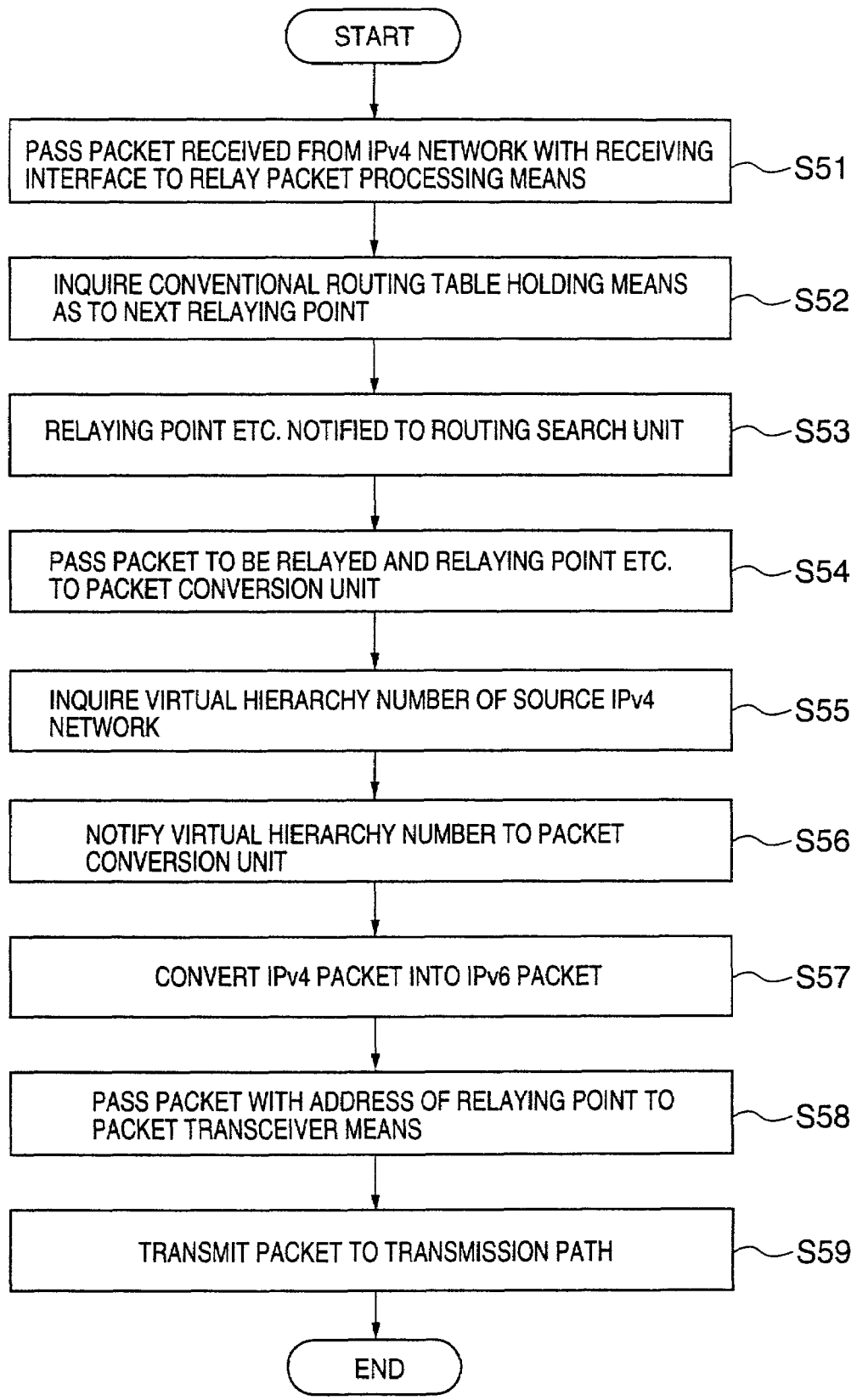
FIG. 23 is a flowchart of an embodiment of a process of packet relay from an IPv4 network to an IPv6 network.

Next, a process of packet relay from an IPv4 network to an IPv6 network, which the virtual hierarchy compliant router of the present invention performs, will be described. FIG. 23 is a flowchart of an embodiment of the process of the packet relay from the IPv4 network to the IPv6 network.

Step S51. The packet receiving unit 11 of the packet transceiver means 10 receives a packet from the IPv4 network, and passes the packet and a receiving interface name to the packet relay processing means 20.

Step S52. The routing search unit 21 of the packet relay processing means 20 determines that the packet to be relayed is a packet from an IPv4 network by the receiving interface name, and asks the conventional routing table holding means 70 about a next relaying router or a host.

Step S53. The conventional routing database unit 71 of the conventional routing table holding means 70 provides the following contents to the routing search unit 21. The contents are (a) an address of a next relaying point or a host, (b) transmitting interface name, and (c) a hierarchy level of destination address of the packet.

Step S54. The routing search unit 21 passes the packet to be relayed and information obtained at the Step S53 to the packet conversion unit 22.

Step S55. The packet conversion unit 22 asks the virtual hierarchy management means 30 as to the virtual hierarchy of the network to which a transmitting party's IPv4 address belongs.

Step S56. The virtual hierarchy memory unit 32 of the virtual hierarchy management means 30 provides the virtual hierarchy number of the IPv4 network to the packet conversion unit 22.

Step S57. Format conversion is performed on the received IPv4 packet to be converted to an IPv6 packet based on the results of the steps S53 through S56.

Step S58. The format-converted packet is passed to the packet transceiver means 10 with an address of a next relaying router or a host and the transmitting interface name.

Step S59. The packet is sent out to a transmission path from the packet transmitting unit 12 of the packet transceiver means 10.

Figure 24:
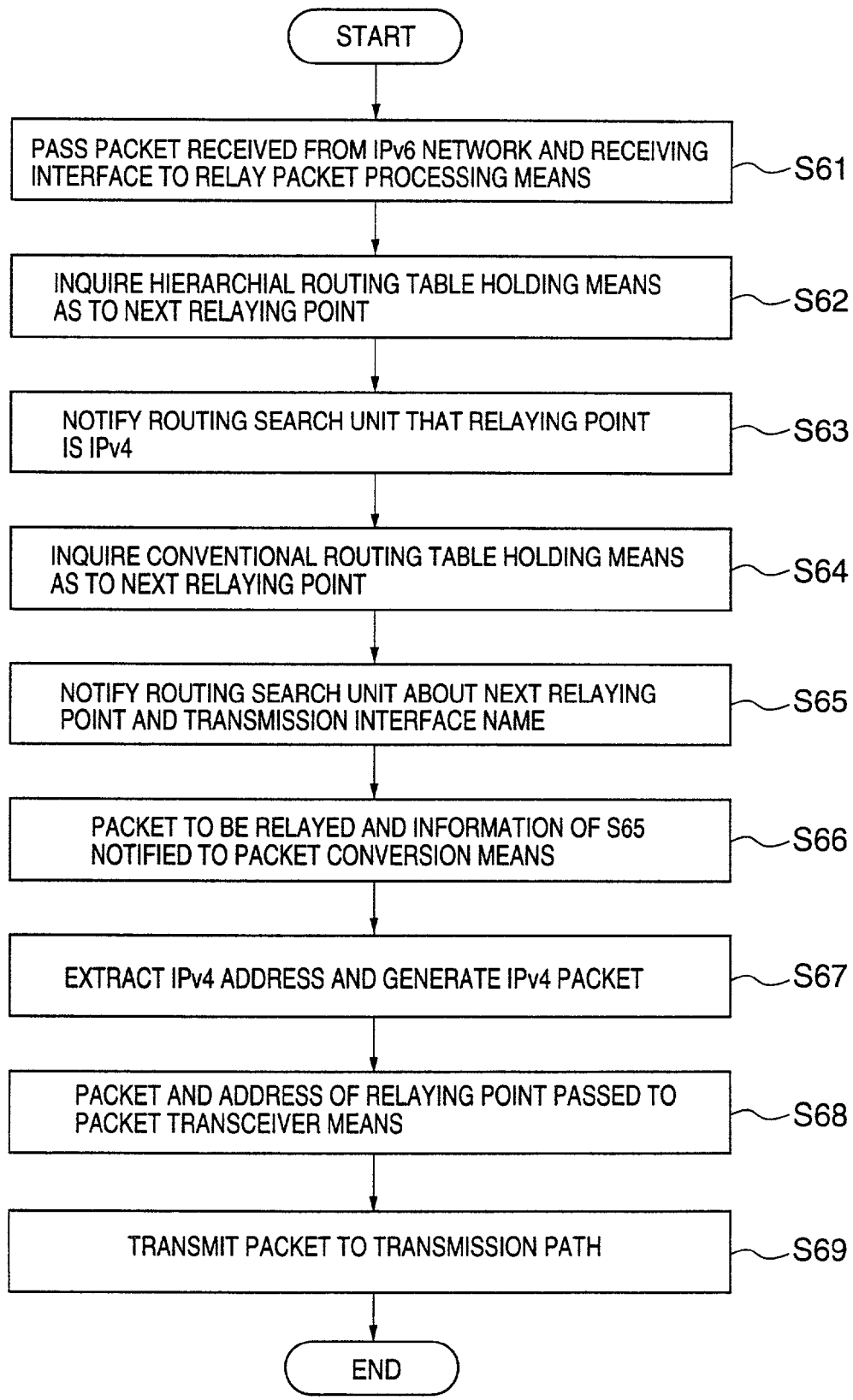
FIG. 24 is a flowchart of an embodiment of a process of packet relay from an IPv6 network to an IPv4 network.

Next, a process of a packet relay from an IPv6 network to an IPv4 network, which the virtual hierarchy compliant router of the present invention performs, will be described. FIG. 24 is a flowchart of an embodiment of the process of the packet relay from the IPv6 network to the IPv4 network.

Step S61. The packet receiving unit 11 of the packet transceiver means 10 receives a packet from the IPv6 network, and passes the packet and a receiving interface name to the packet relay processing means 20.

Step S62. The routing search unit 21 of the packet relay processing means 20 determines from the receiving interface name that the packet to be relayed is a packet from an IPv6 network, and asks the hierarchical routing table holding means 60 as to a router as a next relaying point or a host.

Step S63. The hierarchical routing database unit 61 of the hierarchical routing table holding means 60 provides the routing search unit 21 that the next relaying point is an IPv4 network.

Step S64. The routing search unit 21 asks the conventional routing table holding means 70 as to the next router for relaying or the host.

Step S65. The conventional routing database unit 71 of the conventional routing table holding means 70 provides the following contents to the routing search unit 21. The contents are (a) address of the next relaying router or a host, and (b) a transmitting interface name.

Step S66. The routing search unit 21 passes the packet to be relayed with the information obtained at step S65 to the packet conversion unit 22.

Step S67. Since this is the packet relay from the IPv6 network to the IPv4 network, the packet conversion unit 22 extracts a destination address formed into a hierarchy compliant IPv4 compatible IPv6 address, and an address contained in the interface ID block of the sender address, and an IPv4 packet is generated.

Step S68. The packet generated at step S67 is passed to the packet transceiver means 10 with the transmitting interface name and the address of the next relaying router or a host.

Step S69. The packet transmitting unit 12 of the packet transceiver means 10 transmits the packet to a transmission path.

Figure 25:
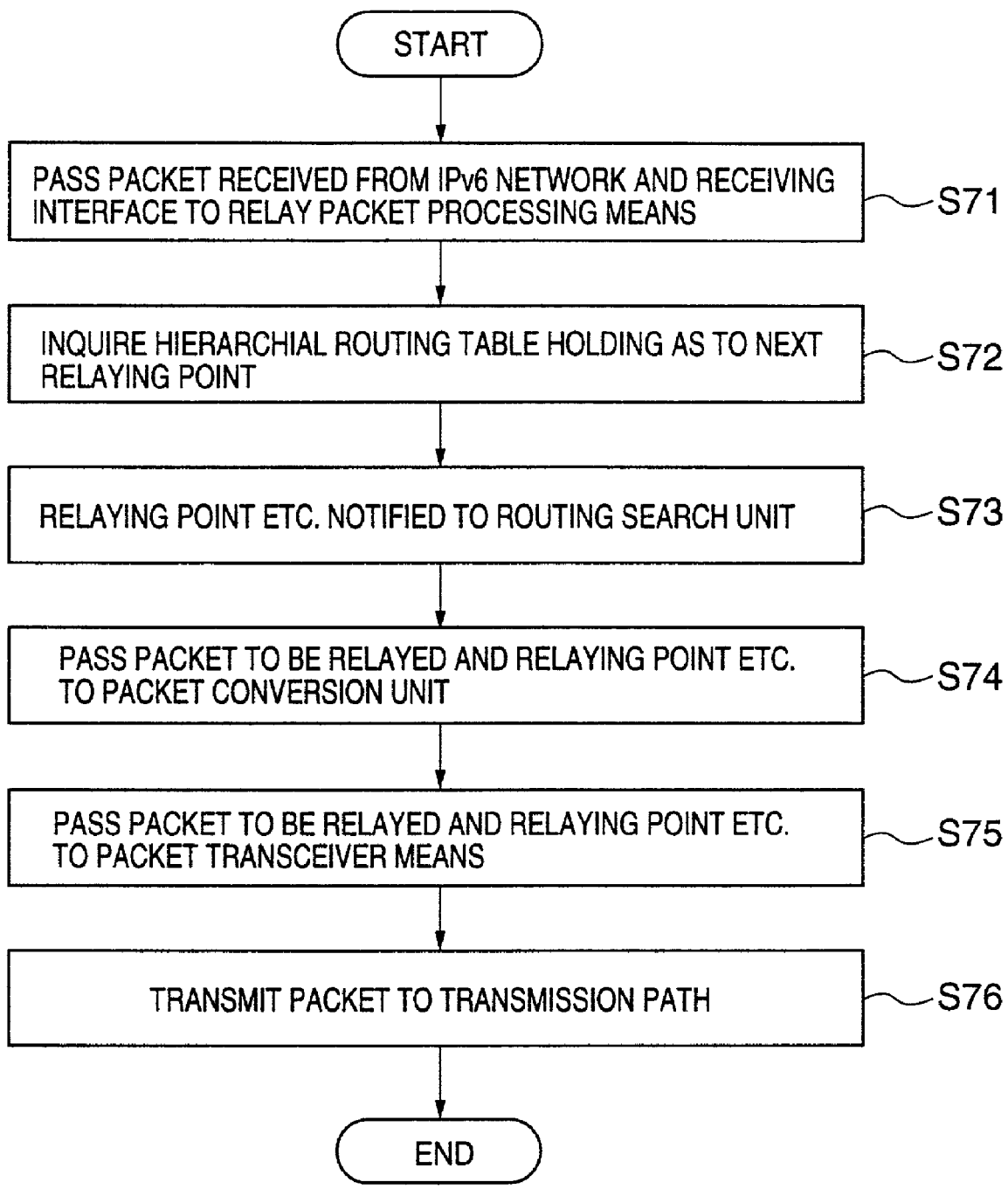
FIG. 25 is a flowchart of an embodiment of a process of packet relay from an IPv6 network to an IPv6 network.

Next, a process of packet relay from an IPv6 network to another IPv6 network, which the virtual hierarchy compliant router of the present invention performs, will be described. FIG. 25 is a flowchart of an embodiment of the process of the packet relay from a first IPv6 network to a second IPv6 network.

Step S71. The packet receiving unit 11 of the packet transceiver means 10 receives a packet from the first IPv6 network, and passes the packet and a receiving interface name to the packet relay processing means 20.

Step S72. The routing search unit 21 of the packet relay processing means 20 determines based on the receiving interface name that a packet to be relayed is a packet from the first IPv6 network, and asks the hierarchical routing table holding means 60 about a next relaying router or a host.

Step S73. The hierarchical routing database unit 61 of the hierarchy routing table holding means 60 provides the following contents to the routing search unit 21. The contents are (a) address of the next relaying router or the host, and (b) a transmitting interface name.

Step S74. The routing search unit 21 passes the packet to be relayed with information obtained at step S73 to the packet conversion unit 22.

Step S75. Since this is the packet relay from an IPv6 network to another IPv6 network, the packet conversion unit 22 does not process, but passes the packet to be relayed to a packet transceiver means with the transmission interface name and the address of the next relaying router or a host.

Step S76. The packet transmitting unit 12 of the packet transceiver means 10 sends out the packet to a transmission path.

In this embodiment, hierarchical routing control can be applied to routing control of an IPv4 network within an IPv6 network, in the case that the IPv6 network is used as a backbone connecting IPv4 networks. Further, the IPv4 network that uses an IPv6 network as a backbone can perform conventional operations, without being aware of the presence of the IPv6 network.

Figure 26:
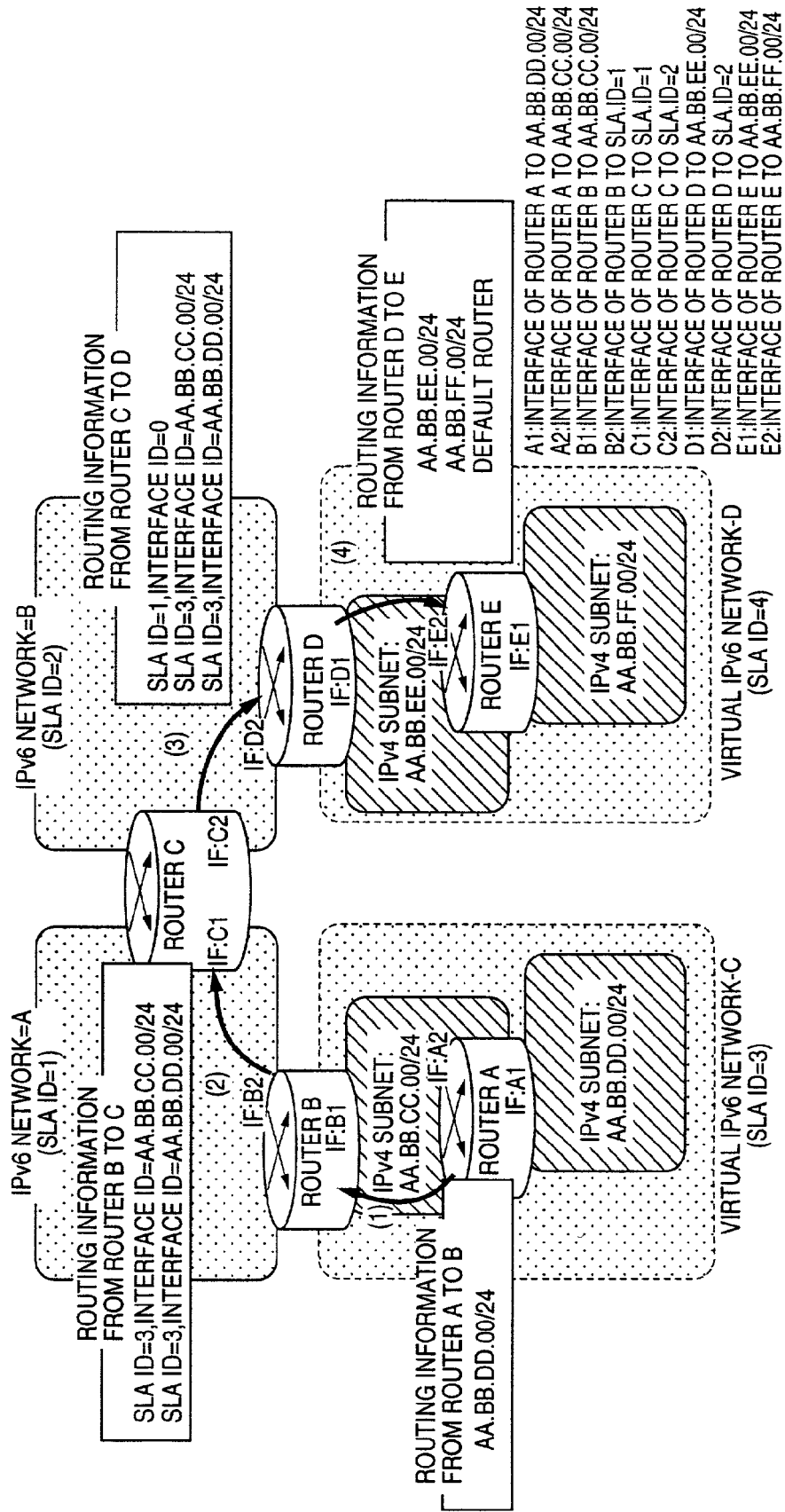
FIG. 26 is a drawing for explaining routing information exchange in a mixed environment of a hierarchical network and a non-hierarchical network, to which the present invention is applied.

Here, a description will follow on a routing information exchange in a network shown in FIG. 26. FIG. 26 is a drawing for explaining routing information exchange in a mixed environment of a hierarchical network and a non-hierarchical network where the present invention is applied. In FIG. 26, IPv6 networks of SLAID=2 and SLAID=1 are connected by a router C. In addition, an IPv4 network (address AA.BB.CC.OO/24) is connected to the IPv6 network of SLAID=1 through a router B. A user assigns SLAID=3 as a hierarchy number to an IPv4 network accommodation interface (B1) of the router B. The address AA.BB.CC.OO/24, and an address AA.BB.DD.OO/24 are connected via a router A which is a conventional IPv4 router.

Further, an IPv4 network (address AA.BB.EE.OO/24) is connected to the IPv6 network of SLAID=2 through a router D. A user assigns SLAID=4 as a hierarchy number to an IPv4 accommodation interface (D1) of the router D.

The address AA.BB.EE.OO/24, and an address AA.BB.FF.OO/24 are connected via a router E which is a conventional IPv4 router.

FIG. 26 shows how routing information is exchanged between the routers B and D via the router C. FIGS. 27 through 29 show a hierarchical routing table and a conventional routing table of the routers B, C, and D, respectively. Here, although routing information is transmitted also in an opposite directions of those described above, an explanation thereof is omitted since there is no technical difference.

(A) Initialization of the router B

1. The virtual hierarchy management means 30 of the router B assigns a virtual hierarchy SLAID=3 to the interface (B1) to the IPv4 network by user operation and the like, and stores it in the virtual hierarchy memory unit 32. Furthermore, the virtual hierarchy management means 30 generates an "IPv4" entry in the hierarchical routing table holding means 60, which indicates that an IPv6 packet of the virtual hierarchy SLAID=3 terminated at this router shall henceforth be transmitted by the conventional technique of IPv4, and generates a "Direct" entry in the conventional routing table holding means 70, which indicates that the address AA.BB.CC.00/24 belongs to SLAID=3 and is a network directly accessible from the router B.

2. The virtual hierarchy management means 30 generates a "Direct" entry in the conventional routing table holding means 70 and the hierarchical routing table holding means 60, which indicates that SLAID=1 is a directly accessible network.

(B) Receiving routing information and generating a table in the router B

1. As shown by (1) in FIG. 26, the packet receiving unit 11 of the packet transceiver means 10 of the router B receives IPv4 routing information from the router A, and passes the packet to the routing information receiving means 40 with the receiving interface name (B1).

2. Since the interface is an interface with an IPv4 network, the routing information selection unit 41 of the routing information receiving means 40 passes the packet and the receiving interface name (B1) to the IPv4 routing information processing unit 43.

3. The IPv4 routing information processing unit 43 obtains a hierarchy number SLAID=3 assigned to the receiving interface (B1) which accommodates the IPv4 network by querying the virtual hierarchy memory unit 32, and generates an entry of AA.BB.CC.00/24 to the conventional routing table of the router B shown in FIG. 27.

(C) Transmitting routing information from the router B

1. The timer unit 51 of the routing information transmitting means 50 of the router B directs the transmitting routing information generating unit 52 to transmit routing information of SLAID=1 and a transmission interface (B2) to the network.

2. The transmitting routing information generating unit 52 generates routing information for entries of networks other than with the transmitting interface B2 among the entries in the conventional routing table holding means 70 of the router B. At this time, each entry of IPv4 is formed into an IPv6 address by virtualization compliant IPv4 compatible IPv6 address format.

3. As shown by (2) in FIG. 26, the generated routing information is transmitted to the network of SLAID=1 via the packet transceiver unit 10.

(D) Receiving routing information and generating a table in the router C

1. The router C is a router that is directly connected to networks of SLAID=1 and 2, therefore, similar to the initial setting of the router B, it has a "Direct" entry in the hierarchical routing table and the conventional routing table for SLAID=1 and 2, respectively.

2. The packet receiving unit 11 of the packet transceiver means 10 of the router C receives routing information from the router B, and passes the packet and a receiving interface name (C1) to the routing information receiving means 40.

3. Since the interface is an interface with an IPv6 network, the routing information selection unit 41 of the routing information receiving means 40 passes the packet and the receiving interface name (C1) to the IPv6 routing information processing unit 42.

4. The IPv6 routing information processing unit 42 determines whether received information is routing information in format of the virtualization compliant IPv4 compatible IPv6 address, or routing information in the form of an IPv6 address. Here, since either (SLAID=3, interface ID=AA.BB.CC.00/24, or SLAID=3, interface ID=AA.BB.DD.00/24) is in the virtualization compliant IPv4 compatible IPv6 address format, one entry of the hierarchy number (SLAID=3) is generated into the hierarchical routing table holding means 60, and each entry is generated into the conventional routing table holding means 70, as shown by dotted areas in FIG. 28.

(E) Transmitting routing information in the router C

1. The timer unit 51 of the routing information transmitting means 50 of the router C directs the transmitting routing information generating unit 52 to transmit the routing information to a network of SLAID=2 and a transmitting interface (C2).

2. The transmitting routing information generating unit 52 generates routing information for entries of networks that do not bear the transmitting interface C2 among the entries in the conventional routing table information holding means 70 of the router C.

3. The generated routing information is transmitted to the network of SLAID=2 via the packet transceiver unit 10, as shown by (3) in FIG. 26.

(F) Initialization of the router D

1. The virtual hierarchy management means 30 of the router D assigns virtual hierarchy SLAID=4 to an interface (D1) to an IPv4 network by user operation and the like, which is stored in the virtual hierarchy memory unit 32. Furthermore, the virtual hierarchy management means 30 generates an "IPv4" entry into the hierarchical routing table holding means 60, which indicates that an IPv6 packet having a virtual hierarchy SLAID=4 in the address is terminated at this router and will be henceforth transmitted by the conventional IPv4 technique, and a "Direct" entry into the conventional routing table holding means 70, which indicates that an address AA.BB.EE.00/24 belongs to SLAID=4, and is a network directly accessible from the router D.

2. The virtual hierarchy management means 30 generates a "Direct" entry into the conventional routing table holding means 70 and the hierarchical routing table holding means 60, which indicates that that SLAID=2 is a network that is directly accessible.

(G) Receiving routing information and generating table in the router D

1. As shown by (3) in FIG. 26, the packet receiving unit 11 of the packet transceiver means 10 of the router D receives routing information on IPv4 from the router C, and passes the packet to the routing information receiving means 40 with a receiving interface name (D2).

2. Since the interface is an interface with an IPv6 network, the routing information selection unit 41 of the routing information receiving means 40 passes the packet and the receiving interface name (D2) to the IPv6 routing information processing unit 42.

3. The IPv6 routing information processing unit 42 determines whether each entry of the routing information received is the routing information in a virtualization compliant IPv4 compatible IPv6 address format, or the routing information in the format of an IPv6 address. Since the routing information (SLAID=3, interface ID=AA.BB.CC.00/24, and SLAID=3, interface ID=AA.BB.DD.00/24) is in the format of the virtualization compliant IPv4 compatible IPv6 address, one entry of the hierarchical number (SLAID=3) is generated into the hierarchical routing table holding means 60, and an entry is generated by the conventional routing table holding means 70 to each. Furthermore, as a dotted area in FIG. 29 shows, routing information on (SLAID=1, Interface ID=0) is entered into each of the hierarchical routing table holding means 60 and the conventional routing table holding means 70.

(H) Transmitting routing information in the router D

1. The timer unit 51 of the routing information transmitting means 50 of the router D directs the transmitting routing information generating unit 52 to transmit routing information to an address AA.BB.EE.00/24 (transmitting interface D1).

2. The transmitting routing information generating unit 52 generates routing information that designates the router D as a default router for a network entry other than the transmitting interface being D1 among the entries of the conventional routing table information holding means 70 of the router D.

3. As shown by (4) in FIG. 26, the generated routing information is transmitted to the address AA.BB.EE.00/24 via the packet transceiver unit 10.

4. A router E, upon receiving this routing information packet, generates its routing table with a conventional IPv4 routing information processing procedure.

Figure 30:
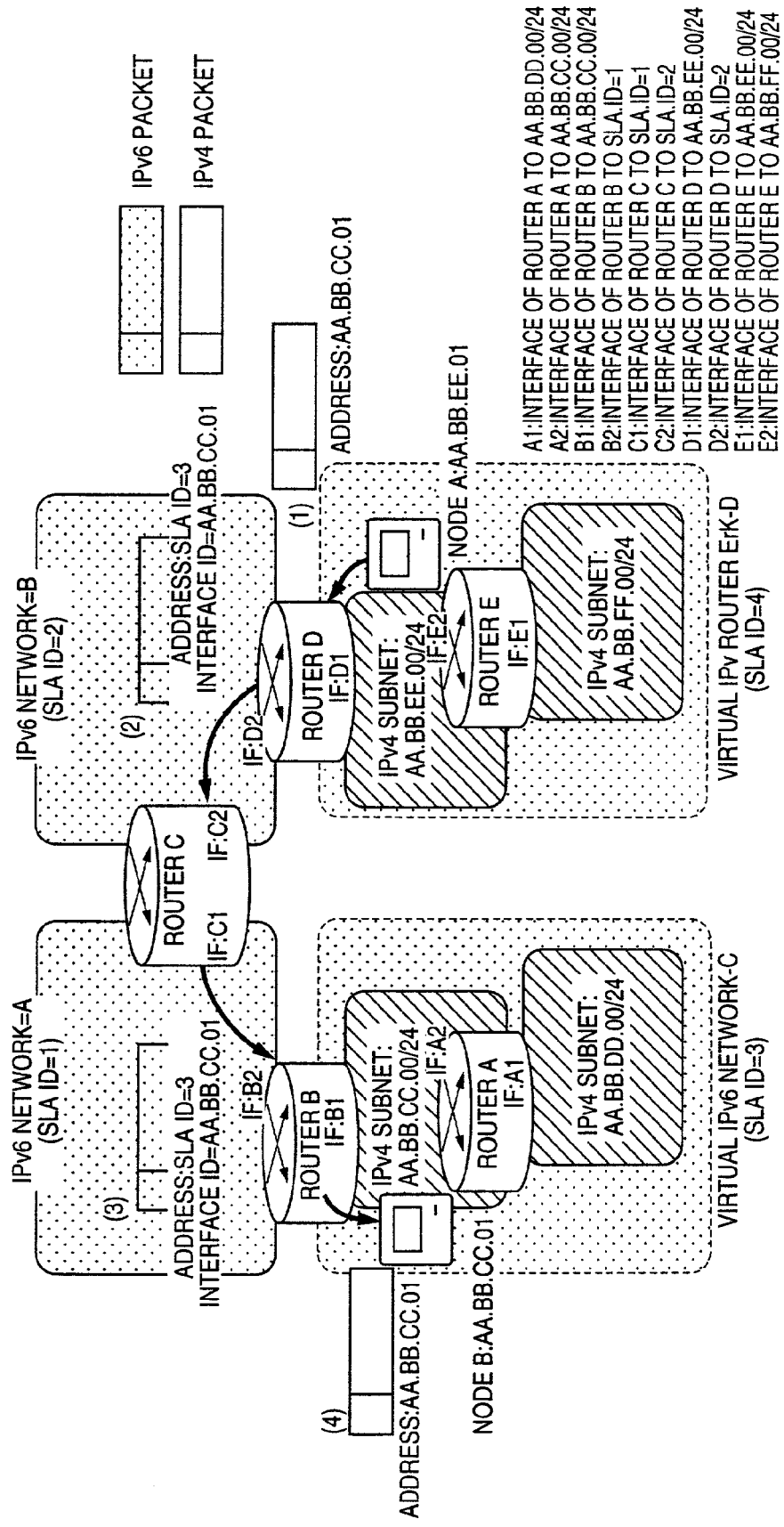
FIG. 30 is a drawing for explaining a packet relay in a mixed environment of a hierarchical network and a non-hierarchical network, to which the present invention is applied.

Next, packet relay in a network shown in FIG. 30 will be described. FIG. 30 is a drawing for explaining the packet relay in a mixed environment of a hierarchical network and a non-hierarchical network where the present invention is applied. In FIG. 30, IPv6 networks of SLAID=1 and SLAID=2 are connected via the router C, similarly to FIG. 26. Further, an IPv4 network (address AA.BB.CC.00/24) is connected to the IPv6 network of SLAID=1 through the router B. A user assigns SLAID=3 as a hierarchy number to the IPv4 accommodation interface (B1) of the router B. The address AA.BB.CC.00/24, and the address AA.BB.DD.00/24 are connected by the router A which is a conventional IPv4 router.

Moreover, the IPv4 network (address AA.BB.EE.00/24) is connected to the IPv6 network of SLAID=2 through the router D. A user assigns SLAID=4 as a hierarchy number to the IPv4 network accommodation interface (D1) of the router D. The address AA.BB.EE.00/24, and an address AA.BB.FF.00/24 are connected by the router E which is a conventional IPv4 router.

FIG. 30 shows how a packet is transmitted from a Node A (AA.BB.EE.01) to a Node B (AA.BB.CC.01). FIGS. 31 through 33 show the hierarchical routing table and the conventional routing table of the routers D, C, and B, at this event, respectively.

(A) Packet transmitting of the Node A

1. As shown by (1) in FIG. 30, the Node A transmits a packet addressed to AA.BB.CC.01 to the router D with the conventional packet transmitting procedure of IPv4.

(B) Packet relaying of the router D

1. The packet receiving unit 11 of the packet transceiver means 10 of the router D receives the packet from the Node A, and passes the packet and a receiving interface name (D1) to the routing search unit 21 of the packet relay processing means 20.

2. Because the receiving interface (D1) is an interface that accommodates an IPv4 network, the routing search unit 21 searches the conventional routing table holding means 70 to find a match as indicated by a dotted area of the routing table of the router D as shown in FIG. 31, obtaining the following information: that a hierarchy of destination address is SLAID=3, that a next relaying router is the router C, and that an interface to the router C should be D2.

3. Since the interface D2 is on an IPv6 network, the packet to be relayed will be converted from IPv4 to IPv6, for which the routing search unit 21 passes the packet to be relayed to the packet conversion unit 22 with a search result of the conventional routing table holding means 70.

4. The packet conversion means 22 converts sender's address (AA.BB.EE.01) and receiver's address (AA.BB.CC.01) of the packet into a virtualization compliant IPv4 compatible IPv6 address format, and packetizes the IPv4 packet into an IPv6 packet.

5. The packet conversion means 22 provides the next relaying point (router C) and the interface name (D2), and passes the converted packet to the packet transceiver means 10.

6. As shown by (2) in FIG. 30, the packet transmitting unit 12 of the packet transceiver means 10 relays the packet to be relayed to the next relaying point (router C).

(C) Packet relay of the router C

1. The packet receiving unit 11 of the packet transceiver means 10 of the router C receives the packet from the router D. Since this packet is a packet which must be relayed, the packet and a receiving interface name (C2) are passed to the routing search unit 21 of the packet relay processing means 20.

2. Because the receiving interface (C2) is an interface that accommodates an IPv6 network, the routing search unit 21 searches the hierarchical routing table holding means 60 to find a match as indicated by a dotted area of the routing table of the router C, as shown in FIG. 32, obtaining the following information: that a next relaying router is the router B and an interface to the router B should be C1.

With this hierarchical routing search, the present invention realizes the hierarchical routing search even in relaying a packet between IPv4 networks by the hierarchical routing table holding means 60 at the router B.

3. While the routing search unit 21 passes the packet to be relayed to the packet conversion unit 22 with the search result of the hierarchical routing table holding means 60, the packet conversion unit 22 does not perform conversion processing because it is a packet to be relayed from IPv6 network to IPv6 network.

4. The routing search unit 21 provides a next relaying point (router B) and transmitting interface name (C1), and passes the converted packet to the packet transceiver means 10.

5. As shown by (3) in FIG. 30, the packet transmitting unit 12 of the packet transceiver means 10 relays the packet to be relayed to the next relaying point (router B).

(D) Packet relay of the router B

1. The packet receiving unit 11 of the packet transceiver means 10 of the router B receives the packet from the router C, and passes the packet and a receiving interface name (B2) to the routing search unit 21 of the packet relay processing means 20.

2. Because the receiving interface (B2) is an interface that accommodates an IPv4 network, the routing search unit 21 searches the conventional routing table holding means 70 to find a match as indicated by a dotted area on the left-hand side of the routing table of the router B of FIG. 33, obtaining a result that the next transmission destination is an IPv4 network.

3. As for the IPv4 network, the routing search unit 21 searches the conventional routing table holding means 70, finding a match at the dotted area on the right-hand side of the routing table of the router B of FIG. 33, and obtains the following information: that a destination node is a node belonging to the network of an address AA.BB.CC.00/24 that is subordinate to the router, and that an interface should be B1.

4. Since the destination network of the transmission is an IPv4 network, packet conversion of the packet to be relayed will be performed from IPv6 to IPv4, for which the routing search unit 21 passes the packet to be relayed to the packet conversion unit 22 with the search result of the conventional routing table holding means 70.

5. The packet conversion means 22 extracts an interface ID from sender's address (SLAID=3, interface ID=AA.BB.EE.01) and receiver's address (SLAID=4, interface ID=AA.BB.CC.01) of the packet, assigns them as IPv4 addresses of the sender and the receiver, respectively, and converts the IPv6 packet into an IPv4 packet.

6. The packet conversion means 22 provides the interface name (B1) and that the next relaying point is the node itself (determined by Direct) to the packet transceiver means 10, and passes the converted packet.

7. As shown by (4) in FIG. 30, the packet transceiver means 10 transmits the packet to be relayed by the conventional transmitting technique to the transmission destination (node B).

In this manner, communication between IPv4 networks over an IPv6 network can be realized, employing the routing search that uses the hierarchy number in the IPv6 network, by assigning the IPv4 networks virtual hierarchy numbers equivalent to the hierarchy number in the IPv6 network, attaching the virtual hierarchy number to a packet to be relayed at a router located at an entrance from a first IPv4 network to the IPv6 network when packet relay between the IPv4 networks over the IPv6 network is performed, performing hierarchical routing control by the virtual hierarchy numbers within the IPv6 network, and removing the virtual hierarchy numbers from the packet to be relayed at a second router located at an exit from the IPv6 network to a second IPv4 network.

Moreover, the conventional packet relay defined by the IPv6 network and handling of the virtual hierarchy information in routing information transmission are facilitated by accommodating the IPv4 network address in the interface identification information block of the IPv6 network address format, and by accommodating the virtual hierarchy number in the IPv6 information block of the IPv6 network address format for the conventional packet relay and the routing information transmission defined by the IPv6 network.

In this manner, in an IPv4 network that uses an IPv6 network as a backbone, the IPv4 network can perform operations as usual, without being aware of presence of the IPv6 network as a backbone, and can enjoy the high-speed routing search within the IPv6 network, using the IPv6 routing table for routing to an IPv4 network, thus outstandingly contributing to structuring an IPv6 network.

In addition, the packet conversion unit 22 corresponds to a virtual hierarchy number assigning means and a virtual hierarchy number removing means given in a claim, and the routing search unit 21 corresponds to a routing control means, an IPv6 routing search means, and a conventional routing search means, and a identification means.

What is claimed is:

1. A routing control method in a mixed environment of a network of a first type and a network of a second type, respectively defined by first and second address spaces, the first and second address spaces each having network-identifying and host-identifying portions, wherein the network of the first type provides routing control by referencing a subset of address bits of the network-identifying portion of the first address space, and the network of the second type provides routing control by referencing an entirety of address bits of the network-identifying portion of the second address space, comprising:

assigning the network of the second type a virtual hierarchy number that corresponds to the subset of address bits of the network-identifying portion of the first address space and identifies the network of the second type as a network of the first type subordinate to a router for routing the packet to the network of the first type, attaching the virtual hierarchy number to a packet to be relayed at the router when the packet is to be relayed between the network of the second type and the network of the first type, performing routing control by the virtual hierarchy number within the network of the first type, and removing the virtual hierarchy number from the packet to be relayed at the router when the packet is to be relayed between the network of the first type and a network of the second type, wherein an address of the network of the second type is accommodated in an interface identification information block of an address format of the network of the first type, and the virtual hierarchy number is accommodated in a hierarchy information block of the address format of the network of the first type for said routing control within the network of the first type, each of one or more routers of the network of the first type comprises a first routing table that performs said routing control by using only the hierarchical information block as a key, and a second routing table that performs routing control by using the hierarchical information block and the interface identification information block as keys.

2. The routing control method as claimed in claim 1, wherein each of the one or more routers of the network of the first type uses the first routing table when relaying a packet between the network of the first type and another network of the first type.

3. The routing control method as claimed in claim 1, wherein each of the one or more routers of the network of the first type uses the second routing table when relaying a packet from the network of the first type to the network of the second type, and from the network of the second type to the network of the first type.

4. The routing control method as claimed in claim 3, wherein the router interfacing the network of the first type with the network of the second type recognizes a packet relay from the network of the second type to the network of the first type, and from the network of the first type to the network of the second type, by using a receiving interface name and a transmission interface name when relaying the packet.

5. A routing control apparatus in a mixed environment of a network of a first type and a network of a second type, respectively defined by first and second address spaces, the first and second address spaces each having network identifying and host identifying portions, wherein the network of the first type provides routing, control by referencing a subset of address bits of the network identifying portion of the first address space, and the network of the second type provides routing control by referencing an entirety of address bits of the network identifying portion of the second address space, comprising:

virtual hierarchy number assigning means for assigning the network of the second type a virtual hierarchy number that corresponds to the subset of address bits of the network-identifying portion of the first address space and identifies the network of the second type as a network of the first type subordinate to a router for routing the packet to the network of the first type, and for attaching the virtual hierarchy number to a packet to be relayed at the router when the packet is to be relayed between the network of the first type and the network of the second type, routing control means for performing routing control of the packet by the virtual hierarchy number within the network of the first type, and virtual hierarchy number removing means for removing the virtual hierarchy number from the packet to the relayed at the router when the packet is to be relayed between the network of the first type and a network of the second type, wherein the virtual hierarchy number assignment means accommodates an address of the network of the second type in an interface identification information block of an address format of the network of the first type, and accommodates the virtual hierarchy number in a hierarchy information block of the address form at of the network of the first the for performing said routing control in the network of the first type, each of one or more routers of the network of the first type comprises a first routing table that performs said routing control by using only the hierarchical information block as a key, and a second routing table that performs routing control by using the hierarchical information block and the interface identification information block as keys.

6. The routing control apparatus as claimed in claim 5, wherein each router of the network of the first type comprises a first routing search means that performs routing search using the first routing table when relaying a packet between the network of the first type and another network of the first type.

7. The routing control apparatus as claimed in claim 5, wherein each router of the network of the first type comprises a second routing search means that performs routing search using the second routing table when relaying a packet from the network of the first type to the network of the second type, and from the network of the second type to the network of the first type.

8. The routing control apparatus as claimed in claim 7, wherein the router interfacing the network of the first type with the network of the second type includes recognition means that recognizes a packet relay from the network of the second type to the network of the first type, and from the network of the first type to the network of the second type, using a receiving interface name and a transmission interface name when relaying the packet.

9. A routing control method in a mixed environment of a network of a first type and a network of a second type, respectively defined by first and second address spaces, the first and second address spaces each having network-identifying and host-identifying portions, wherein the network of the fiat type provides routing control by referencing a subset of address bits of the network-identifying portion of the first address space, and the network of the second type provides routing control by referencing an entirety of address bits of the network-identifying portion of the second address space, the method being directed to routing from the network of the second type to the network of the first type via a router and comprising the steps of:

receiving a routing information packet by a packet receiving unit of the router;

forwarding the routing information packet and the receiving interface name to a second network-type routing information processing unit of the router;

retrieving a virtual hierarchy number associated with the receiving interface name by the second network type routing information processing unit, the virtual hierarchy number corresponding to the subset of address bits of the network-identifying portion of the first address space and identifying the network of the second type as a network of the first type subordinate to the router;

writing first routing information to a routing table in a first network-type routing database unit of the router, the first routing information being written in a grouping with the virtual hierarchy number in the routing table of the first network-type routing database unit; and writing second routing information to a routing table in a second network-type routing database unit of the router, the second routing information being written without grouping with the virtual hierarchy number in the routing table of the second network-type routing database Unit.

10. A routing control method in a mixed environment of a network of a first type and a network of a second type, respectively defined by first and second address spaces, the first and second address spaces each having network-identifying and host-identifying portions, wherein the network of the first type provides routing control by referencing a subset of address bits of the network-identifying portion of the first address space, and the network of the second type provides routing control by referencing an entirety of address bits of the network-identifying portion of the second address space, the method being directed to routing from the network of the first type to the network of the second type via a router and comprising the steps of comprising:

receiving a routing information packet by a packet receiving unit of the router;

determining from a receiving interface name for the packet that the routing information packet has been routed from the network of the first type;

forwarding the routing information packet and the receiving interface name to a first network-type routing information processing unit of the router;

determining in the first network-type routing information processing unit whether routing address information of the routing information packet includes a virtual hierarchy number, the virtual hierarchy number corresponding to the subset of address bits of the network-identifying portion of the first address space and identifying the network of the second type as a network of the first type subordinate to the router; and when the routing address information includes a virtual hierarchy number:

writing first routing information to a routing table in a first network-type routing database unit of the router, the first routing information being written in a grouping with the virtual hierarchy number in the routing table of the fist network-type routing database unit, and writing second routing information To a routing table in a second network-type routing database unit of the router, the second routing information being written without grouping with the virtual hierarchy number in the routing table of the second network-type routing database unit.

* * * * *